(12) United States Patent
Yokoi et al.

(10) Patent No.: US 9,098,202 B2
(45) Date of Patent: Aug. 4, 2015

(54) STORAGE APPARATUS AND DATA MANAGEMENT METHOD

(75) Inventors: Nobuhiro Yokoi, Fujisawa (JP);
Masanori Takada, Yokohama (JP);
Nagamasa Mizushima, Yokohama (JP);
Hiroshi Hirayama, Yokohama (JP);
Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 455 days.

(21) Appl. No.: 13/510,797

(22) PCT Filed: Apr. 27, 2012

(86) PCT No.: PCT/JP2012/002928
§ 371 (c)(1),
(2), (4) Date: May 18, 2012

(87) PCT Pub. No.: WO2013/160969
PCT Pub. Date: Oct. 31, 2013

(65) Prior Publication Data
US 2013/0290281 A1    Oct. 31, 2013

(51) Int. Cl.
*G06F 17/30* (2006.01)
*G06F 3/06* (2006.01)

(52) U.S. Cl.
CPC ............ *G06F 3/0608* (2013.01); *G06F 3/0641* (2013.01); *G06F 3/0685* (2013.01); *G06F 17/30153* (2013.01)

(58) Field of Classification Search
CPC .................... G06F 17/30153; G06F 17/30584; G06F 17/30312; G06F 3/0608
USPC ....................................................... 707/693
See application file for complete search history.

(56) References Cited

U.S. PATENT DOCUMENTS

| | | |
|---|---|---|
| 5,652,857 A | 7/1997 | Shimoi et al. |
| 2002/0057213 A1* | 5/2002 | Heath .............................. 341/51 |
| 2002/0133356 A1* | 9/2002 | Romesburg ................... 704/500 |
| 2006/0212625 A1* | 9/2006 | Nakagawa et al. ............. 710/68 |
| 2007/0172134 A1* | 7/2007 | Namera ........................ 382/232 |
| 2008/0168345 A1* | 7/2008 | Becker .......................... 715/242 |
| 2008/0181514 A1* | 7/2008 | Ito .................................. 382/232 |
| 2008/0288678 A1 | 11/2008 | Nakagawa et al. |
| 2010/0058002 A1 | 3/2010 | Voll et al. |

FOREIGN PATENT DOCUMENTS

| | | |
|---|---|---|
| JP | 2006-259962 A | 9/2006 |
| WO | WO 02/25445 A2 | 3/2002 |

OTHER PUBLICATIONS

PCT International Search report on application PCT/JP2012/002928 mailed Jan. 24, 2013; 4 pages.
PCT International Preliminary Report on Patentability on application PCT/JP2012/002928 issued Oct. 28, 2014 with Written Opinion; 5 pages.

* cited by examiner

*Primary Examiner* — Thu-Nguyet Le
(74) *Attorney, Agent, or Firm* — Foley & Lardner LLP

(57) ABSTRACT

A storage apparatus comprises a storage unit configured to store data which is read/written by the host apparatus, a compression/expansion unit configured to compress the data using a predetermined algorithm to generate compressed data, and expand the compressed data, and a control unit configured to control writing of data to the storage unit, wherein the control unit is configured to manage, as compression block units, divided compressed data which is obtained by dividing compressed data compressed by the compression/expansion unit into predetermined units, and padding data.

12 Claims, 23 Drawing Sheets

FIG. 9

| PRE-COMPRESSION | | POST-COMPRESSION | | | | |
|---|---|---|---|---|---|---|
| START ADDRESS | SIZE | START ADDRESS | STORAGE SIZE | | | |
| | | | 1 | 2 | 3 | 4 |
| 0000 | 20 | 0000 | — | — | — | — |
| ⋮ | ⋮ | ⋮ | ⋮ | ⋮ | ⋮ | ⋮ |
| 3000 | 20 | 2220 | 6 | 6 | 6 | 2 |
| 3020 | 20 | 2236 | 20 | — | — | — |
| 3040 | 20 | 2244 | 10 | 10 | — | — |
| ⋮ | ⋮ | ⋮ | ⋮ | ⋮ | ⋮ | ⋮ |

| PRE-COMPRESSION | | POST-COMPRESSION | | | | |
|---|---|---|---|---|---|---|
| START ADDRESS | SIZE | START ADDRESS | STORAGE INFORMATION (START POSITION, SIZE) | | | |
| | | | 1 | 2 | 3 | 4 |
| 0000 | 20 | 0000 | 0,5 | 0,5 | 0,5 | 0,5 |
| ⋮ | ⋮ | ⋮ | ⋮ | ⋮ | ⋮ | ⋮ |
| 3000 | 20 | 2220 | 0,10 | 0,10 | 0,0 | 0,0 |
| 3020 | 20 | 2220 | 0,0 | 10,10 | 0,5 | 0,5 |
| 3040 | 20 | 2236 | 0,10 | 0,10 | 0,0 | 0,0 |

FIG.13

| PRE-COMPRESSION || POST-COMPRESSION ||||||
| START ADDRESS | SIZE | START ADDRESS | STORAGE INFORMATION (START POSITION, SIZE) ||||
| | | | 1 | 2 | 3 | 4 |
|---|---|---|---|---|---|---|
| 0000 | 20 | 0000 | 0,5 | 0,5 | 0,5 | 0,5 |
| ⋮ | ⋮ | ⋮ | ⋮ | ⋮ | ⋮ | ⋮ |
| 3000 | 20 | 2220 | 0,16 | 0,10 | 0,0 | 0,0 |
| 3020 | 20 | 2220 | 0,0 | 10,5 | 0,5 | 0,5 |
| | | 2236 | 0,5 | 0,0 | 0,0 | 0,0 |
| 3040 | 20 | 2236 | 5,10 | 0,10 | 0,0 | 0,0 |
| 401 | 402 | 403 | 405 | 405 | 405 | 405 |

404

400

STORAGE APPARATUS AND DATA MANAGEMENT METHOD

TECHNICAL FIELD

The present invention relates to a storage apparatus and a data management method and is suitably applied to a storage apparatus and a data management method with which data is compressed and stored.

BACKGROUND ART

As a system for storing large-scale data from a host apparatus, a storage apparatus which controls data I/Os from the host apparatus is used. The storage apparatus is a device for managing a multiplicity of drives arranged as an array as a RAID (Redundant Arrays of Independent Disks or Redundant Arrays of Inexpensive Disks). The physical storage area which is provided by a multiplicity of drives contained in the storage apparatus is formed having at least one or more logical areas (hereinafter these areas will sometimes also be referred to as logical volumes) and the logical volumes are provided to the host apparatus.

In order to store large-scale data from the host apparatus, the storage apparatus holds a large-scale storage area, but due to the continuing increase of data from the host apparatus and due to problems with the size and cost of the storage apparatus, there is a need for efficient storage of large-scale data. Therefore, a reversible data compression system which, while still retaining the amount of information of a substantial quality in the data, makes it possible to reduce the amount of data and enables substitution for other data of a small size, has been applied to storage apparatuses (for example, PTL1).

As one example of a data compression system which is applied to storage apparatuses, a sliding dictionary-type data compression system known as the LZ77 compression coding system exists. This system searches a dictionary based on an input data string which has previously undergone coding and a data string in the dictionary which has been subjected to compression processing is maintained as is. Further, this compression system determines whether a data pattern in the input data in the current compression processing exists in the dictionary, and if such a data pattern exists, utilizes the data length which matches the position as a code value and substitutes the data using this code value.

CITATION LIST

Patent Literature

PTL 1: Japanese Published Unexamined Application No. 2006-259962

SUMMARY OF INVENTION

Technical Problem

However, in a storage apparatus with a built-in compression function as described above, since data is compressed in data management units in the storage apparatus and stored in storage devices, if a command to rewrite a portion of the data from the host apparatus is issued, there is a problem in that rewrite processing must be executed on the compressed data, not only on the rewritten part of the data but on all the pre-compression data including the rewritten part. More specifically, the storage apparatus performs rewrite processing by expanding the compressed data thus read, performing data rewriting, re-executing compression processing, and writing [the data] back to the storage device. Thus, there is a problem in that, in order for the reading to the drive and writing back to the drive to be executed for all the data, there is an I/O bandwidth load during data transfer, as well as a processing load due to the expansion of all the data and the re-compression, thus leading to a drop in the performance of the storage apparatus.

The present invention was conceived in view of the above and proposes a storage apparatus and data management method which alleviate the processing load when rewriting portions of compressed data.

Solution to Problem

In order to solve this problem, the present invention is a storage apparatus which is connected via a network to a host apparatus which issues data I/O requests, comprising a storage unit which stores data which is read/written by the host apparatus; a compression/expansion unit which compresses the data using a predetermined algorithm to generate compressed data, and expands the compressed data; and a control unit which controls writing of data to the storage unit, wherein the control unit manages, as compression block units, divided compressed data which is obtained by dividing compressed data compressed by the compression/expansion unit into predetermined units, and padding data.

With this configuration, compressed data which has been compressed by the compression/expansion unit is divided into predetermined units, a recompression/absorption area is added to the data and managed as a compression block unit. As a result, when a portion of the data is rewritten, the data can be rewritten by reading but not expanding all the compression target data, or expanding the data by reading the data one compression block unit at a time, thereby permitting efficient data rewriting and recompression processing and alleviating the processing load.

Advantageous Effects of Invention

According to the present invention, the performance of a storage apparatus can be improved by alleviating the processing load when rewriting portions of compressed data.

BRIEF DESCRIPTION OF DRAWINGS

FIG. 9 is a table showing the content of a compression management table according to this embodiment.

FIG. 11 is a table showing content of a compression management table according to this embodiment.

FIG. 13 is a table showing content of a compression management table according to this embodiment.

DESCRIPTION OF EMBODIMENTS

An embodiment of the present invention will be described in detail hereinbelow with reference to the drawings.

(1) First Embodiment

(1-1) Computer System Configuration

Figure 1:
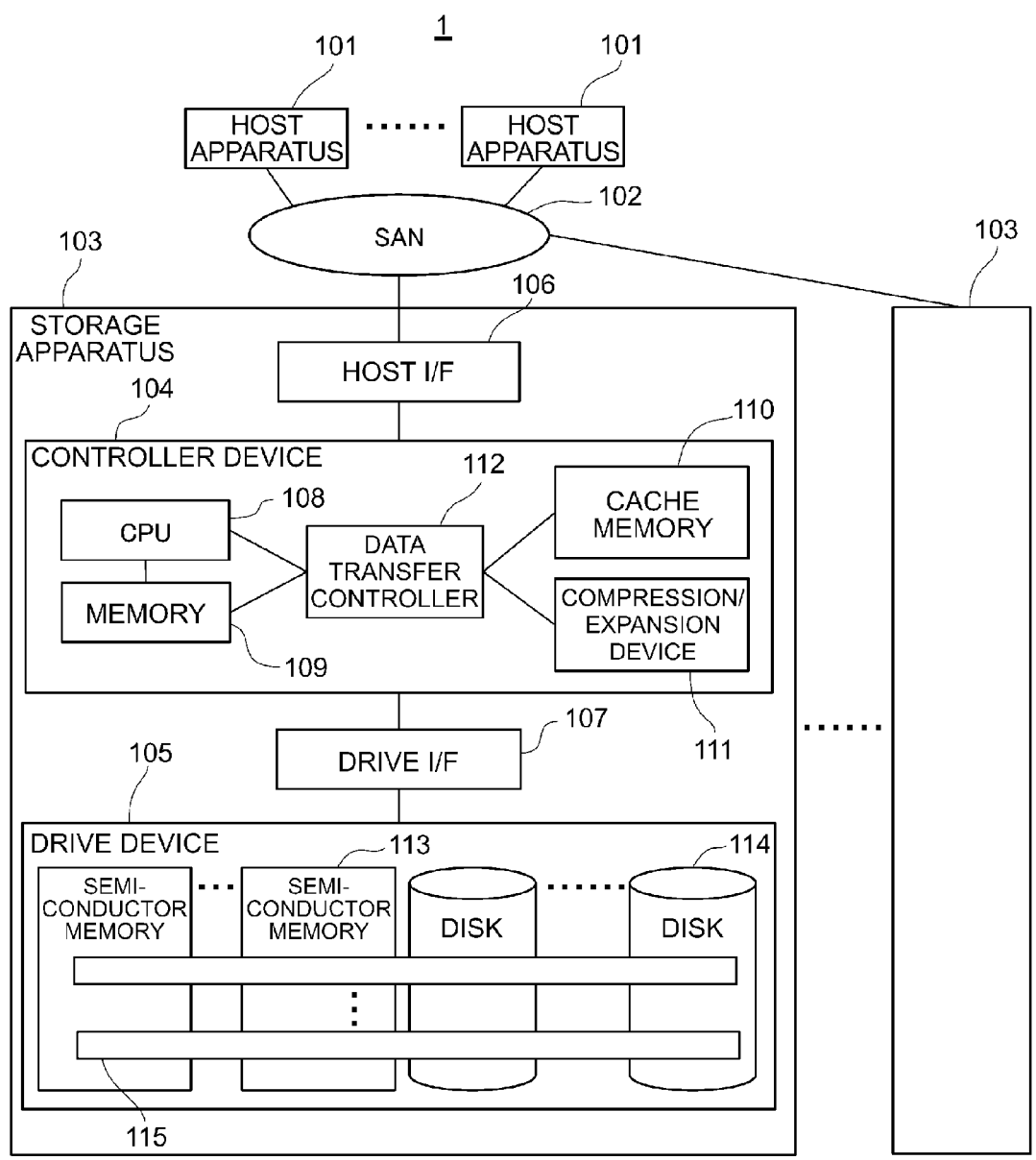
FIG. 1 is a block diagram showing a configuration of a computer system according to a first embodiment of the present invention.

The configuration of a computer system 1 according to this embodiment will be described next. As shown in FIG. 1, the computer system 1 is configured from one or more host apparatuses 101, a SAN (Storage Area Network) 102, and one or more storage apparatuses 103. The host apparatus 101 is connected to the storage apparatus 103 via the SAN (Storage Area Network) 102. Note that although not shown in the drawings, a management terminal which controls a plurality of storage apparatuses 103 may also be provided.

The host apparatus 101 is a computer device which comprises an arithmetic device such as a CPU (Central Processing Unit), a memory, information processing resources such as drives or other storage areas and, if necessary, information I/O devices such as a keyboard, a mouse, a monitor display, a speaker, and/or a communication OF card, the host apparatus 101 being configured from a personal computer, workstation, or mainframe or the like, for example.

The storage apparatus 103 is a storage device which performs storage control and mainly comprises a controller device 104 for controlling the storage apparatuses and a drive device 105 which is a storage area.

The controller device 104 mainly comprises a host interface (abbreviated to host IF in the drawings) 106, a drive interface (abbreviated to drive OF in the drawings) 107, a CPU 108, a memory 109, a cache memory 110, a compression/expansion device 111, and a data transfer controller 112. Further, the controller device 104 may also comprise a network interface other than the host interface 106 and drive interface 107 and may comprise an interface for receiving and issuing control commands. Furthermore, a dedicated device such as an encoder and a decoder may also be provided in addition to the compression/expansion device 111.

The host interface 106 is a controller for controlling the interface with the host apparatus 101 and comprises, for example, a function for receiving and transmitting Fibre channel protocol-based block access requests which are issued by the host apparatus 101.

The drive interface 107 is a controller for controlling the interface with the drive device 105 and comprises, for example, a function for controlling data I/Os based on a protocol for controlling semiconductor memory 113 and disks 114 in the drive device 105.

The CPU 108 is an arithmetic device for controlling write access and read access to the drive device 105 in accordance with data I/O requests from the host apparatuses 101. Further, the CPU 108 utilizes information in the memory 109 to control the storage apparatus 103, control various devices in the controller device 104, and control the drive device 105. In addition, if connected to an external management terminal, the CPU 108 executes commands issued by the management terminal to control the storage apparatus 103.

The memory 109 is a storage device which stores results during arithmetic processing by the CPU 108 and management table information, and so on. Further, [the memory 109] may also store a program for controlling the storage apparatus 103. The CPU 108, the compression/expansion device 111, and the other devices in the controller device may also utilize the memory 109 when executing various processing.

The cache memory 110 is a memory which is used as a buffer for temporarily storing write data which is written to the semiconductor memory 113 and disks 114 in the drive device 105, and read data which is read from the semiconductor memory 113 and disks 114 in the drive device 105. The cache memory 110 is configured as a non-volatile memory and comprises a function for preventing the loss of saved data, even when a sudden power fault occurs, by means of a power backup or the like.

The compression/expansion device 111 is a device for compressing write data which is written to the semiconductor memory 113 and disks 114 in the drive device 105 and for reading and expanding data which is compressed and written to the semiconductor memory 113 and disks 114 in the drive device 105. Further, the compression/expansion device 111 may also expand data which has been compressed by a device other than the storage apparatus 103. The compression/expansion device 111 may also be configured with an independent compression device and expansion device. Furthermore, the compression/expansion device 111 may also be configured from one or more general-purpose processors such as the CPU 108.

For example, instead of being independently connected to the data transfer controller 112 as shown in FIG. 1, the compression/expansion device 111 may also be configured as a function in the host interface 106, the drive interface 107, the memory 109, the cache memory 110, the data transfer controller 112, and the drive device 105. Further, the number of compression/expansion devices 111 configured may be one or more. Furthermore, instead of being physical hardware, the compression/expansion device 111 may also be a program which is processed by the CPU 108, for example. The operations of devices such as the compression method and expansion method will be described in detail subsequently.

The data transfer controller 112 is connected to the host I/F 106, the drive I/F 107, the CPU 108, the memory 109, the cache memory 110, and the compression/expansion device 111, and controls data transfers with the host apparatuses 101 and with the semiconductor memory 113 and disks 114 in the drive device 105.

The drive device 105 mainly comprises a drive interface (abbreviated to drive I/F in the drawings) 107, which is an interface with the controller device 104, semiconductor memory 113, and the disks 114. Further, [the drive device 105] may also comprise a network interface other than the drive I/F 107 and an interface which receives and issues commands from/to a device other than the controller device 104, and may also comprise storage media, storage mechanisms, and storage devices other than the semiconductor memory 113 and disks 114. Furthermore, one or more drive devices 105 may also be provided depending on the configuration of the storage apparatus 103.

The semiconductor memory 113 is a memory which is configured from a semiconductor element and is a volatile memory or involatile memory, and may be a storage device such as a RAM (Random Access Memory) disk drive or an SSD (Solid State Drive). The semiconductor memory 113 in the drive device 105 is configured from one or more of the semiconductor memory 113.

The disks 114 are mainly hard disk drives and are storage devices such as FC (Fiber Channel) disk drives, SATA (Serial Advanced Technology Attachment) disk drives, PATA (Parallel Advanced Technology Attachment) disk drives, SAS (Serial Advanced SCSI) disk drives or SCSI (Small Computer System Interface) disk drives. Further, storage devices other than the semiconductor memory 113 and disks 114 may also be configured from tape drives, other storage media and disks. The disks 114 in the drive device 105 are configured from one or more of the disks 114.

Other than being provided with physical address information indicating a physical location, storage areas such as the semiconductor memory 113 and disks 114 may also be provided, in consideration of access by the host apparatus 101 and the controller device 104, with a logical volume 115 for management using logical addresses of one or more of each or both of the semiconductor memory 113 and disks 114. Note that the logical volume 115 may be one or more areas and the management blocks may be the same or different.

The elements which comprise the foregoing storage apparatus 103 may be provided in a plurality depending on the configuration of the storage apparatus 103. For example, [the storage apparatus 103] may comprise a plurality of the host interface 106 and the drive interface 107 and comprise a plurality of the controller device 104 and the drive device 105. Furthermore, [the storage apparatus 103] may be configured comprising one or more devices and functions, i.e. comprise a plurality of each of the devices and functions in the controller device 104 and comprise a plurality of each of the devices and functions in the drive device 105.

(1-2) Logical Configuration of Storage Apparatus (1-2-1) Thin Provisioning Function and Hierarchical Data Management Method The logical configuration of the storage apparatus 103 will be described next. The storage apparatus 103 according to this embodiment contains a virtual function called thin provisioning which is one function installed in the storage apparatus. The thin provisioning function is a function which provides a virtual logical volume (hereinafter called a virtual volume) to the host apparatus 101 and which, when a data write request to write to the virtual volume is supplied from the host apparatus 101, dynamically assigns a storage area to the virtual volume. The thin provisioning function is advantageous in that a virtual volume of a larger capacity than the storage area which is actually available can be provided to the host apparatus and the physical storage capacity in the storage apparatus which is to be prepared can be reduced, whereby a computer system can be built at a low cost.

Furthermore, as a data management method of the storage apparatus in which such a thin provisioning function is installed, a hierarchical data management method has conventionally been proposed. The hierarchical data management method manages each of the storage areas provided by each of the plurality of types of storage devices of varying performance installed in the storage apparatus as storage tiers of a plurality of different types, assigns storage areas from a high-speed, high-performance storage tier to an area where high access frequency data is stored in the virtual volume and assigns storage areas from a low-speed, low-performance storage tier to an area where low access frequency data is stored in the virtual volume. With this hierarchical data management method, an improvement in the cost performance of the storage apparatus can be achieved.

Figure 2:
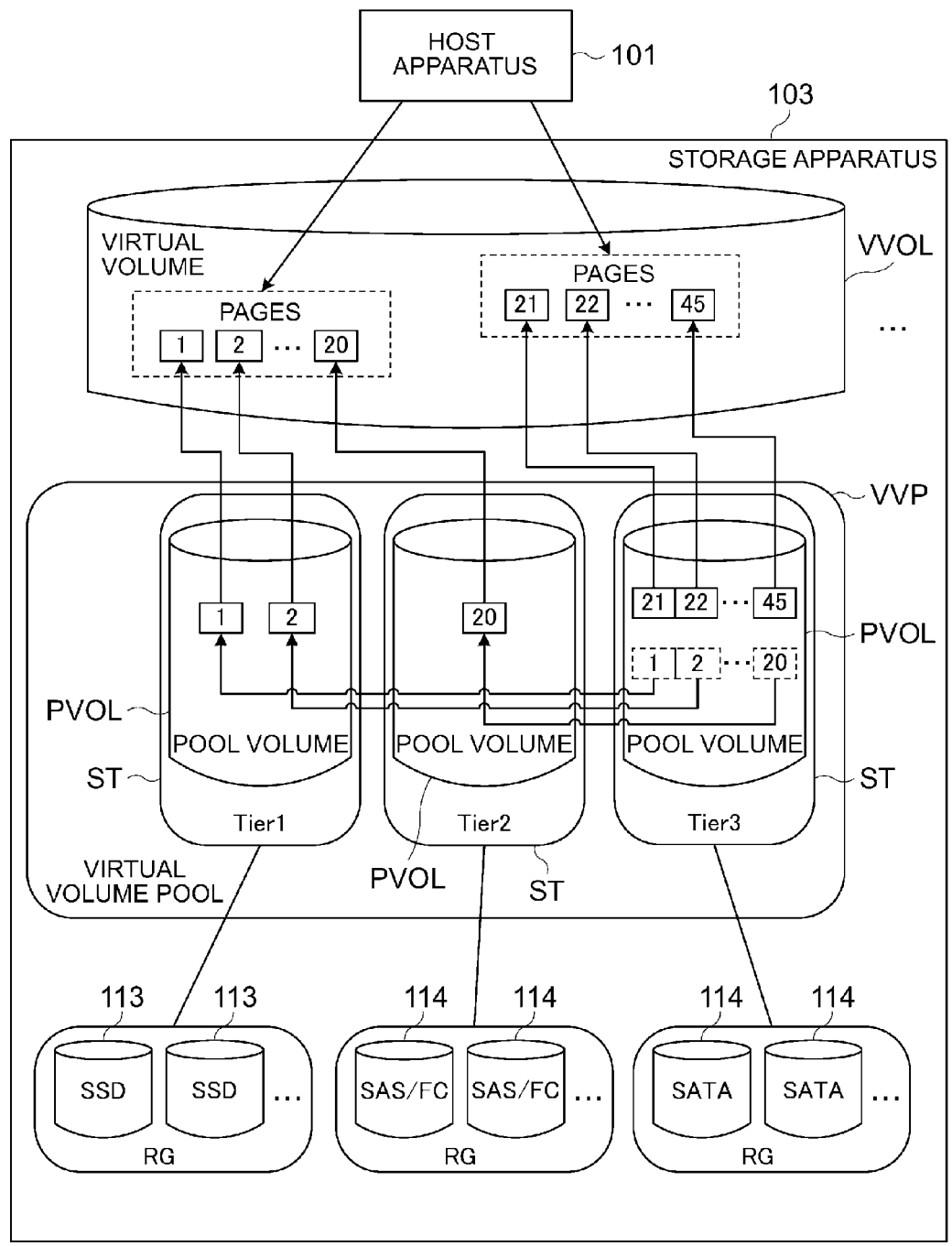
FIG. 2 is a conceptual diagram showing a logical configuration of a storage apparatus according to this embodiment.

The hierarchical data management method of the storage apparatus 103 comprising the foregoing thin provisioning function will be described hereinbelow. FIG. 2 shows the logical configuration of the storage apparatus 103. As is also clear from FIG. 2, in the storage apparatus 103, RAID groups RG are defined from one or more storage devices 113 or 114 of the same types (SSD, SAS/FC and SATA or the like), and one or more pool volumes PVOL are defined in storage areas provided by one or more storage devices 350 comprising one RAID group. The pool volumes PVOL defined in the storage areas provided by storage devices 113 or 114 of the same type are each managed as storage tiers ST of the same type and a plurality of pool volumes PVOL belonging to different storage tiers ST are managed as a single resource pool RP.

In the case of this embodiment, as described earlier, four types of storage devices 30 are used, namely, SSD as the storage devices 113 and SAS disks, FC disks and SATA disks as the storage devices 114, a pool volume PVOL which is defined in the storage area provided by one or more SSD is managed as a storage tier referred to as Tier1 (hereinafter called the first storage tier) ST, a pool volume PVOL which is defined in the storage area provided by one or more SAS disks or FC disks is managed as a storage tier referred to as Tier2 (hereinafter called the second storage tier) ST, and a pool volume PVOL which is defined in the storage area provided by one or more SATA disks is managed as a storage tier referred to as Tier3 (hereinafter called the third storage tier) ST.

Note that among the types of the storage devices 113 or 114 (SSD, SAS/FC, and SATA), the storage device type which is the most reliable and has the highest response performance is the SSD, the storage device type which is the next most reliable and has the next highest response performance is the SAS disk or FC disk, and the storage device type which is the least reliable and has the lowest response performance is the SATA disk. Accordingly, in the case of this embodiment, among the first to third storage tiers ST comprising the resource pool RP, the storage tier which is the most reliable and which has the highest response performance is the first storage tier ST, while the storage tier which is the next most reliable and has the next highest response performance is the second storage tier ST, and the storage tier which is the least reliable and has the lowest response performance is the third storage tier ST.

Meanwhile, one or more virtual volumes VVOL are defined in the storage apparatus 103. The virtual volumes VVOL are each assigned individual identifiers (hereinafter called LUN (Logical Unit Number)). Further, the area in the virtual volume VVOL is divided up into blocks of a predetermined size (hereinafter called logical blocks), and is managed using individual numbers which are assigned to each of the logical blocks (hereinafter called LBA (Logical Block Addresses). The data I/O requests (write requests and read requests) for the virtual volume VVOL from the host apparatus 101 are made by designating the LUN of the virtual volume VVOL from/to which data is read and written, the LBA of the leading logical block of the area from/to which the data in the virtual volume VVOL is read/written, and the data length.

Any one resource pool RP is pre-associated with each of the virtual volumes VVOL. Further, if a data write request to write to the virtual volume VVOL is received from the host apparatus 101, the storage apparatus 103 assigns storage area of a required amount in units of a predetermined size called pages from the resource pool RP associated with the virtual volume VVOL to the area designated in the write request in the virtual volume VVOL which is designated in the write request, and writes write target data to the assigned pages.

Here, pages are basic units of the storage area assigned to the virtual volume VVOL from any of the storage tiers (first to third storage tiers) ST comprising the resource pool RP associated with the virtual volume VVOL. Although, in the following description, one page and one logical block of the virtual volume VVOL are described as being storage areas of the same size, the storage area sizes are not necessarily the same.

Further, when pages are assigned from the resource pool RP corresponding to the virtual volume VVOL, the storage apparatus 103 assigns pages in order starting with the pool volume PVOL which belongs to the storage tier ST which is the most reliable and has the highest response performance among the assignable pool volumes PVOL. Therefore, the storage apparatus 103 comes to assign pages to the virtual volume VVOL from the pool volume PVOL until unassigned pages are exhausted in the pool volume PVOL in order starting with the pool volume PVOL which belongs to the first storage tier ST, followed by the pool volume PVOL which belongs to the second storage tier ST, and then the pool volume PVOL which belongs to the third storage tier ST.

Meanwhile, the storage apparatus 103 monitors the frequency of access by the host apparatus 101 per unit of time to each of the logical blocks of the virtual volume VVOL in parallel with the foregoing processing to assign pages to the virtual volume VVOL.

Further, the storage apparatus 103 migrates data, on an as needed basis, between the first to third storage tiers ST such that, based on the access frequency per unit of time, pages are assigned from the first or second storage tier ST, which is more reliable and has a higher response performance, to logical blocks with a high access frequency and such that pages are assigned from the second or third storage tier ST, which is less reliable and has a lower response performance, to logical blocks with a low access frequency, at regular or irregular intervals.

(1-2-2) Compressed Data Structure

Figure 3:
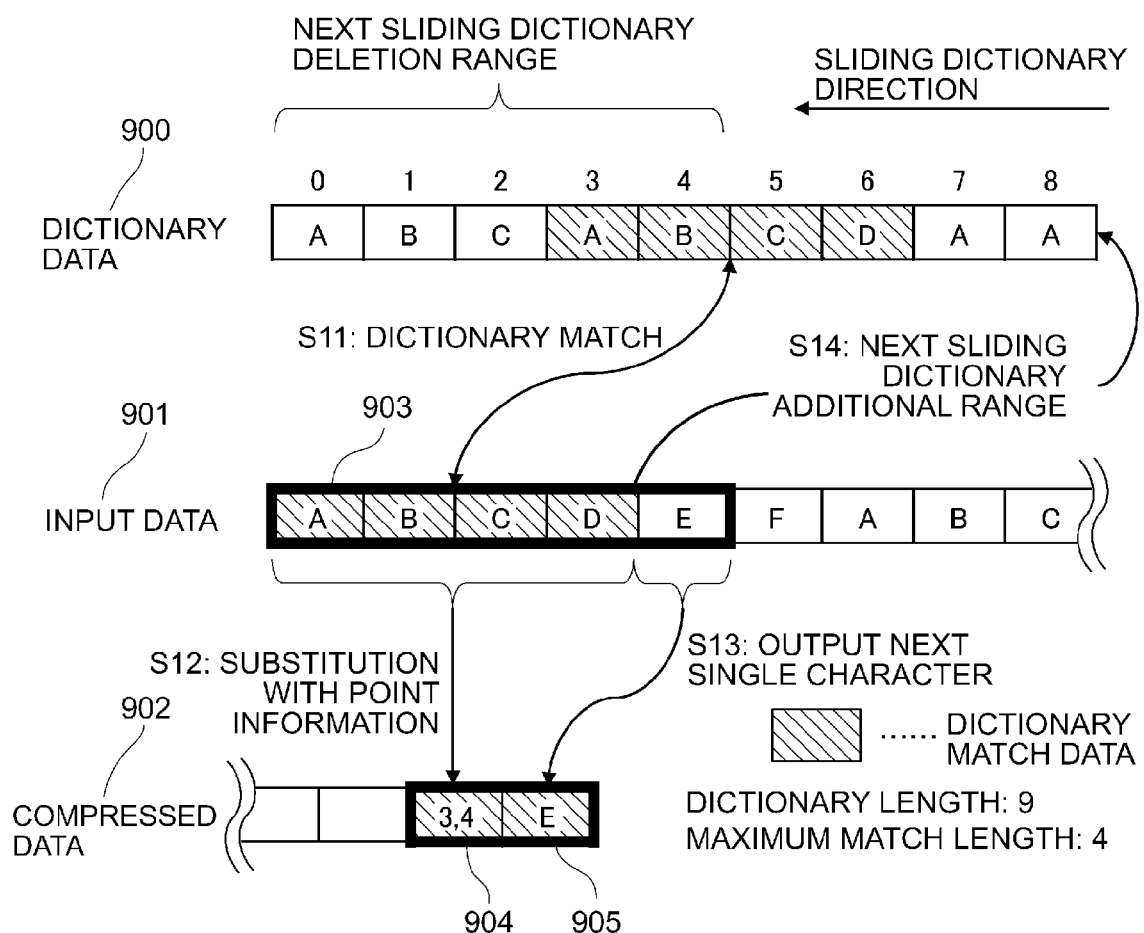
FIG. 3 is a conceptual diagram illustrating LZ77 coding according to this embodiment.

First, LZ77 coding, which is an example of the compression/expansion function, will be described. As shown in FIG. 3, during compression, unused sliding dictionary data 900 is first prepared. At this time, the maximum length of data for which the dictionary and dictionary data length match is decided beforehand. In FIG. 3, by way of example, for the dictionary length 9, the maximum match length is 4. Further, the dictionary is searched for a pattern which matches the data pattern of an input data 901 string which is the processing target (S11). Here, if the match length reaches an upper limit value, the search is then suspended. If there are a plurality of matching data patterns, all such patterns are retrieved.

As a result of the search, the position in the dictionary of the processing target data 903 which is the data pattern with the longest match length is retrieved together with length point information 904 and both values are output (S12). If there is no matching pattern, point information 904 is output as (0,0). If there is a matching pattern, a single data 905 following the matching data is output as is, and if there is no match, input data 901 without a match is output as is (S13).

The data string which is processed last is added to the end of the dictionary (S14). As a result, if the data length of the dictionary is exceeded, the first part of the dictionary is deleted in order to not exceed the dictionary data length. The processing of S1 to S4 is repeated until there is no more input data 901 to be processed.

Figure 4:
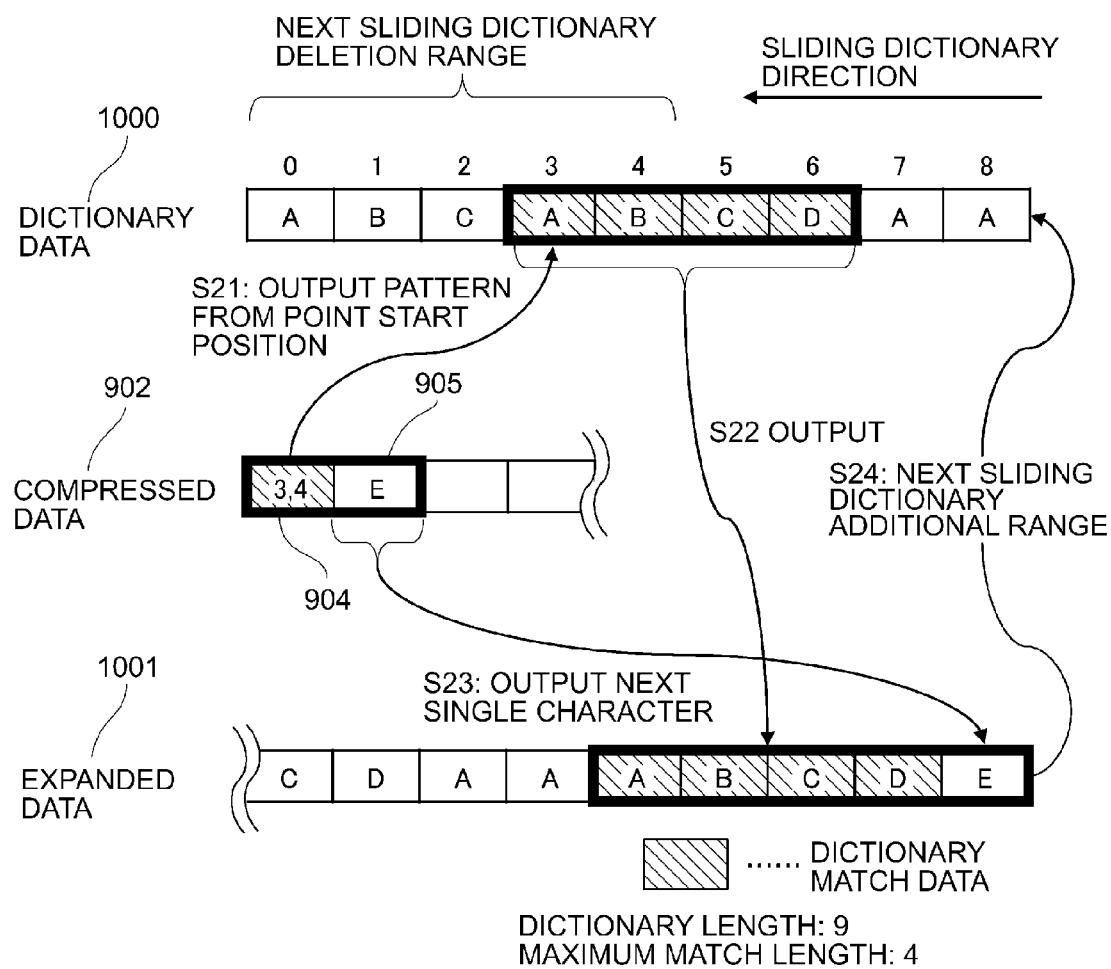
FIG. 4 is a conceptual diagram illustrating LZ77 coding according to this embodiment.

Further, as shown in FIG. 4, during expansion, the point information 904 is first read from the compressed data 902. A data pattern starting with the start position of the point information 904 is then output from the dictionary data 1000 as expanded data 1001 in a length corresponding to the match length (S21). Here, the output data values are sequentially added to the dictionary data 1000 (S22). The next single data 905 is subsequently output as is as expanded data 1001 (S23) and the data value thus output is added to the dictionary data 1000 (S24). S21 to S24 are repeated until there is no more compressed data 902.

Thus, when data from the host apparatus 101 is stored in a logical volume, compression processing is performed on the data in order to enable efficient usage of the logical volume capacity.

Figure 5:
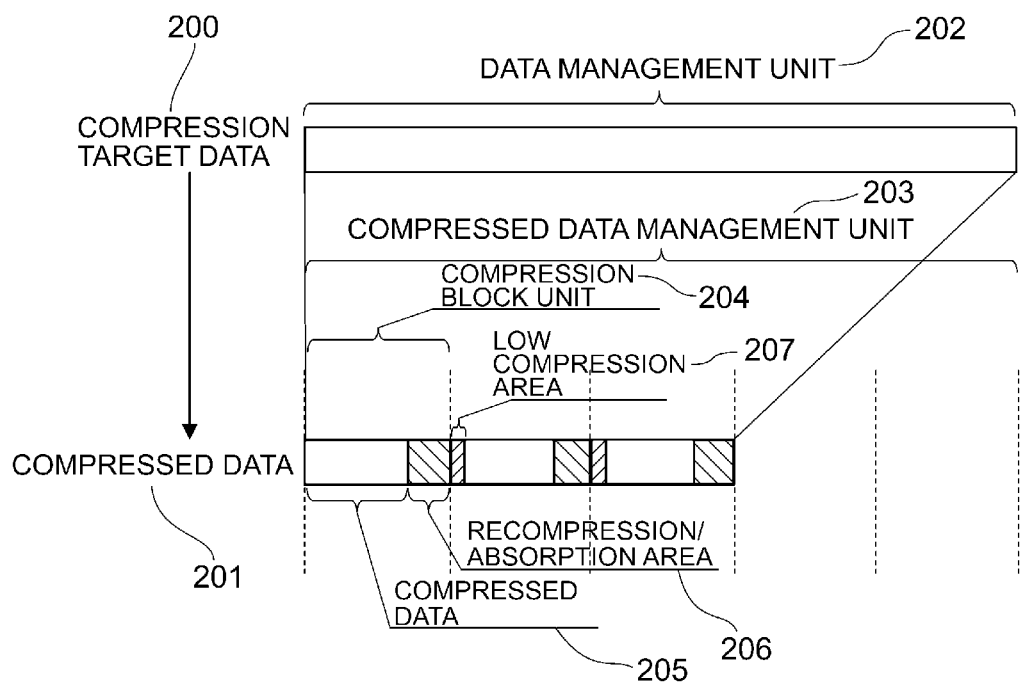
FIG. 5 is a conceptual diagram showing a compressed data structure according to this embodiment.

The structure of the compressed data according to this embodiment will be described next with reference to FIG. 5. When write access is made by the host apparatus 101, the data serving as the compression target is the compression target data 200 among the data written to the drive device 105 in the storage apparatus 103. When the compression target data 200 is compressed using the compression/expansion device 111, the structure of compressed data 201 results. The structure of the compressed data 201 will be described hereinbelow.

The compression target data 200 is managed in data management units 202 which are handled in the storage apparatus 103. The data management units 202 may all be of the same length or may be managed in a plurality of different lengths. When the compression target data 200 is compressed, if there is data with a compression result, the size of the data is reduced as per the compressed data 201. However, in the case of data for which there is no compression result, the compressed data 201 may be larger than the compression target data 200.

If the compression target data 200 is compressed in the compressed data 201, after the pre-compression data management units 202 are compressed, the compressed data is managed in compressed data management units 203. The compressed data management units may all be of the same length or may be managed in a plurality of different lengths. The maximum value of the compressed data management units 203 may be the same as the pre-compression data management units 202 and may be set large or set small.

Furthermore, compression block units 204 are management units which are obtained by dividing the compressed data management units 203 into a plurality of equal sizes or into sizes determined using optional ratios. The total of the compressed block units generated from the compressed data management units 203 is equal to the maximum value of the compressed data management units 203.

The compression block units 204 are configured from padding data of the compressed data 205 and the recompression/absorption area 206. The compressed data 205 is data obtained by compressing the compression target data 200, and the size of the compressed data 205 is obtained by removing the recompression/absorption area 206 from the compression block units 204. Further, since there is no dependency on the dictionary used during compression between each of the compression block units 204 obtained by dividing the compressed data management units 203, the data can be expanded and recompressed in the compression block units 204. The method of generating the compressed data 201 will be described in detail subsequently.

The recompression/absorption area 206 is an area in which, by rewriting data once same has been compressed, the part which has undergone a size increase is absorbed. The size of the recompression/absorption area 206 may be common size among the compression block units 204 obtained by dividing the compressed data management units 203 or may be of a different size in the position of the compression block units 204. The padding data may be 0 data or the previous data may be stored as is, and as long as a storage area for absorbing the increase during recompression can be secured, no consideration is given to the contents of the data.

Furthermore, the recompression/absorption area 206 may also change in size depending on the compression rate during compression. For example, if the compression rate is high as a result of the compression processing, the compressed data after recompression will likely be large even when there is a small change in the compressed data. Therefore the recompression/absorption area 206 is set larger than normal in order to cope with the change in size during recompression. Conversely, if the compression rate is low, it is unlikely that the compressed data after recompression will be large if there is slight change in the compressed data. The recompression/absorption area 206 is therefore set smaller than normal.

Accordingly, if the compression result of the compression data divided into compression block units is high [compression], since the compressed data is then small, even when the recompression/absorption area 206 is large, this area lies within the compression block unit. Further, if the compressed data compression result is low, since the compressed data is large, the recompression/absorption area 206 is small and lies within the set compression block unit. Note that the change in size may differ in each of the compression block units. For example, in a first compression block unit, since the compression result is high, the recompression absorption area is set large and, in a second compression block unit, the compression result is low, and therefore a change in size may be implemented in order to set the recompression/absorption area small.

Furthermore, if the data, once compressed, is expanded and rewritten and the data is recompressed and the size increases or decreases, the size of the recompression/absorption area 206 may be changed by the recompression of the compressed data 205 such that, if the data decreases in size, the recompression/absorption area 206 is made large or small and, if the data increases in size, the recompression/absorption area 206 is made small or large, thereby controlling the recompression/absorption result.

Furthermore, as a configuration for the compressed data management unit 203, in addition to a configuration which holds the compressed data 205 and recompression/absorption area 206 in the compression block unit 204, there may also be a configuration in which, by gathering or dispersing the data in optional predetermined positions in the compressed data management unit 203, information such as the size of the compressed data 205 and the size of the recompression/absorption area 207 is embedded only for the first compression block unit 204 of the compressed data management unit 202 or embedded for all the compression block units 204. In addition, a configuration is also possible in which the number of the data management units 202 compressed and stored in the compressed data management unit 203, and their respective sizes, are stored as header information of the compressed data management unit 203 together with various sizes.

The compression block units 204 may have a configuration where these units are not all the same or may have a configuration where the compression block units 204 are configured with different sizes. Hence, when data is extracted in compressed data management units 203, each of the sizes of the compression block units 204 are held so that there is no misunderstanding of the position of the recompression/absorption area 206 and no misunderstanding of where data is divided. Further, even if the sizes of the recompression/absorption areas 206 are also each different, positions can be ascertained by holding each size of the compression block units 204. Furthermore, there may also be a plurality of compressed data management units 202 in a single compressed data management unit 203, in which case the header information can be used to ascertain the size of the compressed data 205, the size of the recompression/absorption area 206, and the storage location of the plurality of compressed data management units 202.

As a result, the position of the next compression block unit 204 of the compression block units 204 can be obtained by way of calculation, the position of the compressed data management unit 202 to be processed can be obtained through calculation, and the start position of the compression block unit 204 as well as the position of the compressed data management unit 202 in the case of parallel expansion can be acquired.

In addition, the first part of the compressed data 205 corresponding to the first part of the compression block units 204 is a low compression area 207 of a low compression result. The low compression area 207 will be described in detail subsequently.

Although the sliding dictionary compression algorithm known as the LZ77 coding system was described hereinabove by way of example, this embodiment is not limited to this example. For example, if consecutive data of the same value stand in a row as per run-length coding, an algorithm which encodes and records a few of the row data may be used. Further, an algorithm which uses a bias in the probability of occurrence of the data values of such entropy coding may also be used.

First, run-length coding will be described. This compression algorithm finds data starting with the leading data, for example, the data string 11100111 is encoded to generate the data (3, 1), (2, 0), and (3, 1) according to the format (length of consecutive identical values, data value). By omitting unnecessary values in a case where data values with consecutive identical values are stored, data can be efficiently stored.

A case will be described where the compressed data generation method according to the embodiment is applied to run-length coding. First, the compression target data is encoded as above according to an algorithm starting with the leading data. As a result, when the size of the compressed data reaches a size equivalent to an area obtained after removing the recompression/absorption area from the compression block units, the recompression/absorption area is configured and the result of compressing the remaining compression target data is disposed beginning with the start of the next compression block unit. The foregoing processing is repeated until there is no more compression target data. If data straddles compression block units, the data present is divided even when there are consecutive identical data values. As a result, there is no dependency between compression block units and an expandable state is assumed even when a particular part of a compression block unit is removed.

Furthermore, during expansion, the target compression block units are expanded to the original pre-compression data by placing data values with identical values in sequence up to a designated length beginning at the start of the compression block unit. In the case of this algorithm, the low compression area 207 is often unchanged from other compressed data parts and there may be no low compression area 207.

Entropy coding will be described next. This algorithm is based on a method of reducing the data volume by assigning code of a different bit length according to the data frequency of occurrence. For example, assuming there are four types of data, such as A, B, C, and D, the compression target data is then configured from these data types. Here, in all the data of the compression target or previously processed data of the compression target, or in the compression target data targeted for processing, if the code frequency of occurrence in each case is 0.6, 0.1, 0.2, and 0.1, codes are assigned as 00, 110, 10, and 111 respectively so that the greatest data amount of data with a high frequency of occurrence. During data compression, compression is possible by substituting data using the assigned codes.

If the compressed data generation method according to this embodiment is applied to this entropy coding, the previous frequency of occurrence of the compressed data or the processing target compression target data is read once, the frequency of occurrence is acquired, and the coding dictionary for substitution is generated. Thereafter, data compression is carried out in accordance with the dictionary, beginning at the start. Note that, at this time, the dictionary used may be commonly held by all the compression target data, may be managed in a table for each of the compression target data, or may be added to the compressed data to expand the compressed data, and saved.

If the dictionary is added to the compressed data, the dictionary is added to each of the compression block units to enable usage in the expansion of each of the compression block units. When the size of the compressed data reaches a size equivalent to an area obtained by removing the recompression/absorption area from the compression block units, the recompression/absorption area is configured and, depending on the case, the compression dictionary is embedded and the result of compressing the remaining compression target data is disposed beginning at the start of the next compression block unit. Note that the total of the recompression/absorption area 206, the embedded dictionary, and the compressed data 205 may be the compression block unit 204. Since compression is performed using the data frequency of occurrence in entropy coding, cases where there is no low compression area 207 as in FIG. 5 may arise. Further, a case where a dictionary is created by finding all the data is processed as per the foregoing compression generation processing.

In addition, during expansion of the compressed data, the expansion target compression block units are expanded from the start of the data to the original pre-compression data in accordance with the dictionary generated by the foregoing algorithm. If the data compression is performed starting not at the start but at the end, the data is expanded from the end to the original compressed data in accordance with the appropriate algorithm.

(1-3) Operation of Storage Apparatus (1-3-1) Write Access Processing and Read Access Processing Write access processing and read access processing of the storage apparatus 103 will be described next. When write access is made by the host apparatus 101, the data transfer controller 112 of the storage apparatus 103 writes the data received from the host apparatus 101 to the cache memory 110 via the host interface 106.

Further, in order to write data to the semiconductor memory 113 or the disk 114 of the drive device 105, the data transfer controller 112 transfers data to the drive interface 107. Here, if the data write data is compressed, the data transfer controller 112 transfers data stored in the cache memory 110 to the data compression/expansion device 111. The data compression/expansion device 111 to which the data has been transferred compresses the data and transfers the compressed data to the cache memory 110. The data transfer controller 112 transfers the compressed data of the cache memory 110 to the drive interface 107.

In addition, when a read address is issued from the host apparatus 101, the data transfer controller 112 of the storage apparatus 103 reads the data from the semiconductor memory 113 or the disk 114 in the drive device 105 via the drive interface 107 and stores the data in the cache memory 110. The data transfer controller 112 subsequently transfers the data to the host interface 106 in order to transfer the data to the host apparatus 101.

Here, if the read data is compressed, the data transfer controller 112 transfers the data read to the cache memory 110 to the compression/expansion device 111. The compression/expansion device 111 to which the data has been transferred expands the compressed data and transfers the expanded data to the cache memory 110. The data transfer controller 112 transfers the expanded data of the cache memory 110 to the host interface 106.

Note that, in the write access processing and the read access processing, the timing and process flow for transferring data to the compression/expansion device 111 may change depending on the location of the compression/expansion device 111 and the number of compression/expansion devices 111.

For example, if the compression/expansion device 111 is installed in the host interface 106 or the drive interface 107, compression/expansion processing may also be performed during transfer to the cache memory 110. In addition, if the compression/expansion device 111 is installed in a plurality of host interfaces 106 or a plurality of drive interfaces 107, the compression/expansion processing may be carried out by dividing the data in the cache memory 110 by viewing the operating state of the compression/expansion device 111 after temporarily storing the data in the cache memory 110.

(1-3-2) Compressed Data Generation Processing

The method of generating the compressed data 201 shown in FIG. 6 will be described next. In describing the method of generating the compressed data 201, reference will be made to an example of transitions in the compression dictionary length shown in FIG. 7.

Figure 6:
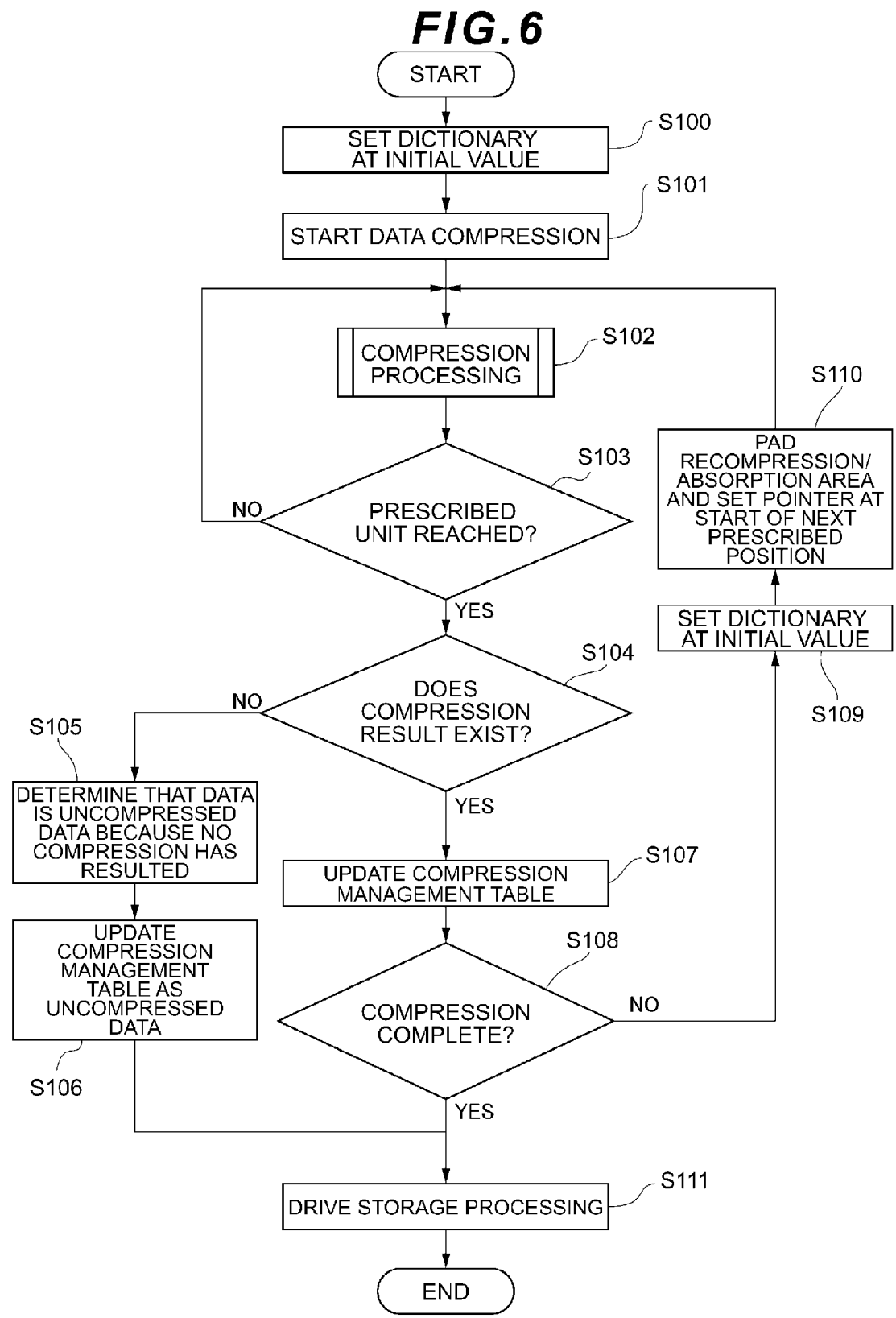
FIG. 6 is a flowchart showing the flow of compressed data generation processing according to this embodiment.

As shown in FIG. 6, when data stored in the cache memory 110 is transferred from the data transfer controller 112, the CPU 108 or the compression/expansion device 111 first sets the dictionary at an initial value (S100). In step S100, the initial value of the dictionary may be an optional value which is determined beforehand or may be in a blank state (=dictionary size 0). Further, after setting the dictionary in step S100, the CPU 108 or the compression/expansion device 111 starts compression of the compression target data 200 by means of the compression/expansion device 111 (S101). The compression start position may be the start of the compression target data 200 or may be set in an optional position such as at the end of the compression target data 200 or in the middle of the compression target data 200 according to a pre-established rule.

The compression/expansion device 111 then executes the compression processing (S102). The compression processing in step S102 is carried out according to an algorithm which the compression/expansion device 111 is compatible with. The algorithm which the compression/expansion device 111 is compatible with is exemplified by the foregoing LZ77 coding system, the run-length coding system, or the entropy coding system, for example, but is not limited to such examples.

Furthermore, the CPU 108 or the compression/expansion device 111 determines whether the size of the compressed data 205 has reached a prescribed unit (S103). More specifically, in step S103, if the compression processing using the foregoing algorithm is advancing and the size of the compressed data 205 has reached a value equivalent to size obtained by removing the recompression/absorption area 206 from the compression block unit 204, the CPU 108 or the compression/expansion device 111 determines that a prescribed unit has been reached.

If it is determined in step S103 that the size of the compressed data 205 has reached a prescribed unit, the CPU 108 or the compression/expansion device 111 determines whether there is a compression result (S104). More specifically, the CPU 108 or the compression/expansion device 111 determines whether there is a compression result by comparing the size of the compressed data 201 compressed in step S102 against the size of the original compression target data 200.

If it is determined in step S103 that the size of the compressed data 205 has not reached the prescribed unit, the CPU 108 or the compression/expansion device 111 returns to step S102 and continues the compression processing.

If it is determined in step S104 that there is a compression result, that is, if the size of the compressed data 201 is compared with the size of the compression target data 200 and the compression rate is high and there is a compression result, the CPU 108 or the compression/expansion device 111 updates the compression management table 400 by storing information on the compressed data in the compression management table 400 (S107). The compression management table 400 will be described in detail subsequently. Note that the update of the compression management table 400 may also be performed after compressing all the compression target data 200.

If, on the other hand, it is determined in step S104 that there is no compression result, that is, if the size of the compressed data 201 is compared with the compression target data 200 and the compression rate is low and there is no compression result, the CPU 108 or the compression/expansion device 111 determines that the data is uncompressed data for which no compression has resulted (S105) and stores information indicating that the data is uncompressed data in the compression management table 400 (S106).

Note that, if it is determined in step S104 that there is no compression result, the CPU 108 or the compression/expansion device 111 may output uncompressed data for which no compression has resulted and stores the data as is in the drive.

Here, the determination of whether there is a compression result in step S104 may be effected for each compression block unit 204 comprising the compressed data management units 203 and or may be carried out when an optional compression block unit 204 is reached, and may be executed in the next-to-last block or the last block. However, if a compression result determination is made in the last block of the compression block unit 204, because the sizes of the compression target data 200 and the compressed data 201 are the same, there is no compression result. This is because the units for storing data in the drive are managed in compression block units 204 and the last block of the compression block units 204 is configured from the compressed data 205 and the padding of the recompression/absorption area 206.

Further, after the compression management table is updated in step S107, the CPU 108 or the compression/expansion device 111 determines whether the compression of the compression target data 200 is complete (S107). If it is determined in step S107 that the compression is not complete, that is, that the compression target data continues, the CPU 108 or the compression/expansion device 111 continues compression of the remaining data of the compression target data 200. When the compression of the remaining data of the compression target data 200 is continued, the compression dictionary is set at an initial value (S109). In addition, since compressed data equivalent to the recompression/absorption area 206 is padded and the next compressed data 205 is stored, a storage position pointer for the compressed data 205 is set in the position of the next compression block unit 204 (start of the prescribed position) (S110). The processing to set the dictionary at an initial value in step S109 may be the same processing as initialization of the dictionary in step S100 or different processing.

The CPU 108 or the compression/expansion device 111 repeats the compression processing until it is determined that compression is complete in step S108 and finally performs the drive storage processing (S110), thereby completing the compression processing.

Figure 7:
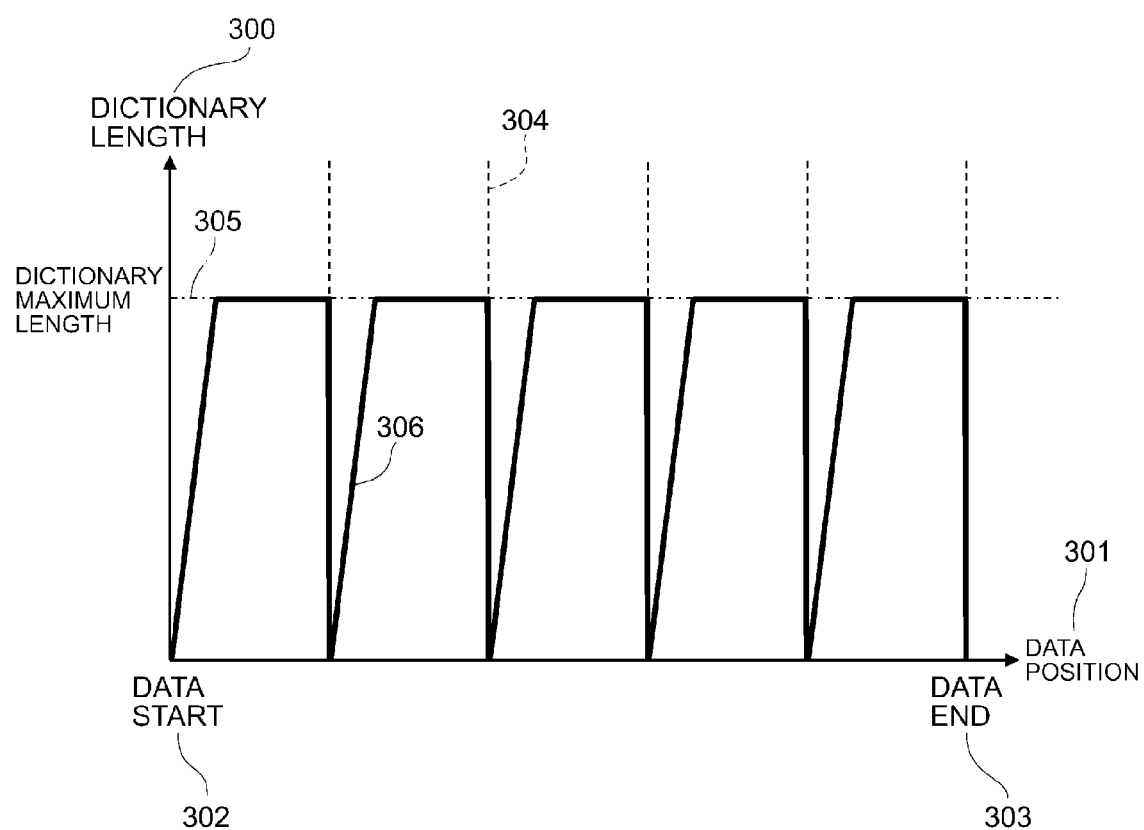
FIG. 7 is a conceptual diagram showing an example of compression dictionary length transitions according to this embodiment.

Here, changes relating to initialization of the dictionary will be described using FIG. 7. In FIG. 7, the dictionary length 300 is plotted on the vertical axis, while the data position 301 is plotted on the horizontal axis. The dictionary length 300 represents the length of the compression dictionary and the data position 301 indicates in which position of the data management unit 202 the compression target data 200 is compressed. Accordingly, the origin of the data position 301 is the position of the data start 302 of the compression target data 200 and the maximum value is the data end 303 of the compression target data 200. The data positions 301 are demarcated by dotted lines 304. The dotted lines 304 represent the compression block units 204. Hence, the gaps between the dotted lines 304 are of equal size or of a size determined by an optional ratio for the sake of illustration using the compression block units 204. The maximum value for the dictionary length 300 is the optionally set dictionary maximum length 305 (dot-chain line in FIG. 4).

The bold lines 306 in FIG. 7 are the dictionary lengths 300 relative to the data position 301. The dictionary length is short for each of the compression block units 204 and, when compression is performed in an advancing data position 301, the dictionary length 300 increases at the dictionary maximum length 305 and is short on the dotted lines 304 which represent the next compression block unit 204. This shows that, although the dictionary length 300 is 0, there is no dictionary dependency for each of the compression block units 204.

As mentioned earlier, in the compression processing according to this embodiment, in order to eliminate the dictionary-dependent relationship, used during compression by the compression block units 204, on the compressed data 201, the dictionary temporarily used in the compression processing is cleared. As a result, there is no dependency of the compression block units 204 and expansion and recompression are possible in the compression block units 204.

The hit rate in searching for a match between the compression target data for compression processing and the dictionary drops. However, if the dictionary is long and the dictionary-dependent relationship remains, the compression rate is high but the processing load of the expansion, rewriting, and recompression during data rewriting is high. Thus, there is a trade-off relationship between the compression rate and the data rewriting processing load. Therefore, by suitably configuring the dictionary maximum length 305 and the substitution maximum length during compression, an adequate compression rate can be secured. For example, as shown in FIG. 7, where the low compression result is concerned, since the data size is bounded by the dictionary reaching the dictionary maximum length 305 once the dictionary is cleared, it may be said that an adequate compression rate is secured. Furthermore, whether the low compression area 207 actually results in low compression depends on the data structure.

Furthermore, by configuring initialization of the dictionary using a certain determined common value for each division of the compression block units 204, an operation is effected such that there is no low compression of the low compression area 207. At this time, because the dictionary for which initialization has been configured is shared, there is no dictionary dependence between the compressed data management units 203 and expansion is possible only in a compression block unit 203 in an optional position.

(1-3-3) Compressed Data Expansion Processing

The method of expanding the compressed data 201 will be described next. As mentioned earlier, the expansion of the compressed data 201 can be performed in compression block units 204 by means of the compression processing of this embodiment.

Figure 8:
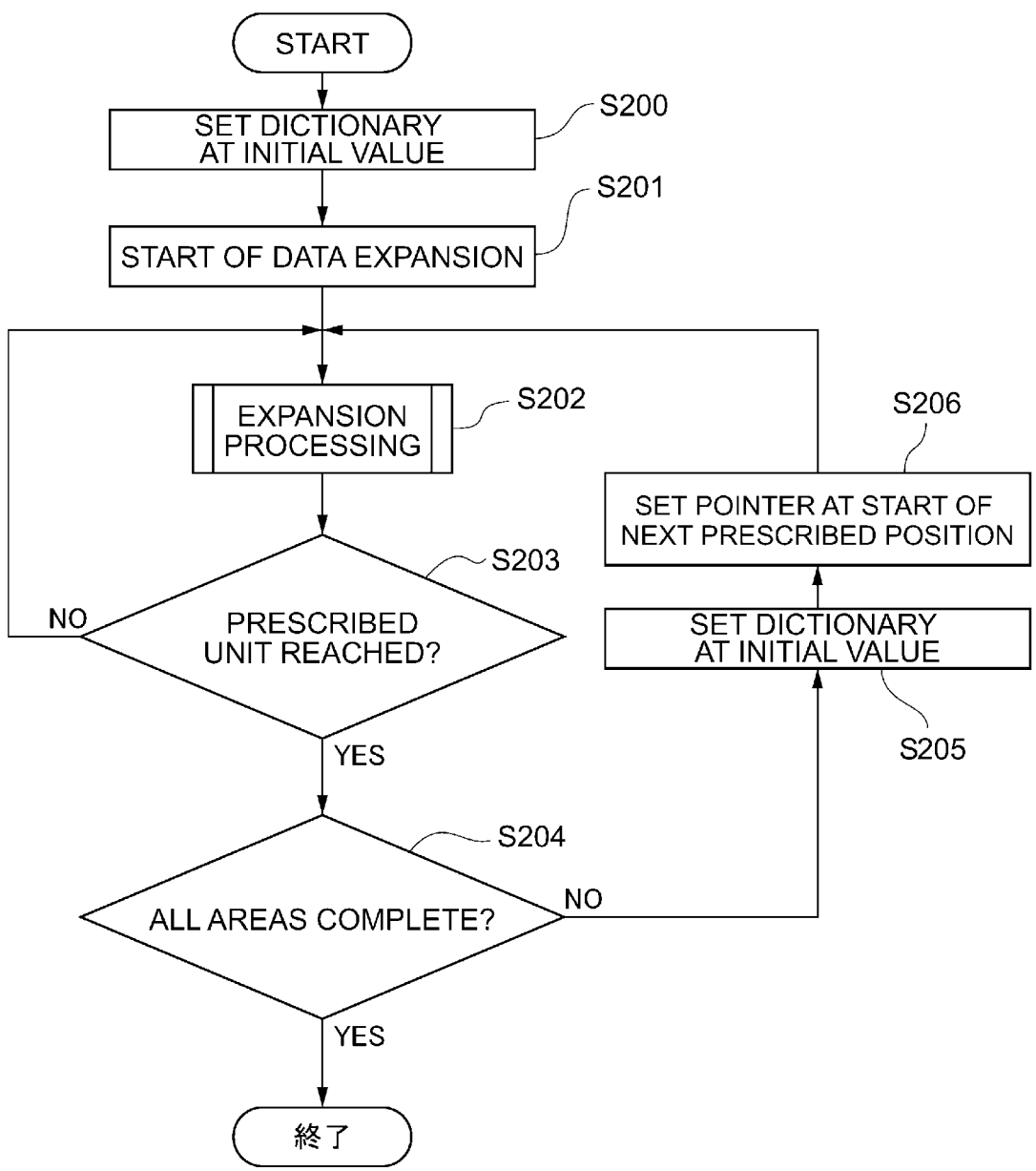
FIG. 8 is a flowchart showing the flow of compressed data expansion processing according to this embodiment.

As shown in FIG. 8, the CPU 108 or the compression/expansion device 111 first sets the dictionary at an initial value (S200). Further, the CPU 108 or the compression/expansion device 111 causes the compression/expansion device 111 to start expansion at the start of the compressed data 201 or in an optional position (S201). The compression/expansion device 111 performs expansion processing (S202). The CPU 108 or the compression/expansion device 111 then determines whether the compressed data has reached a prescribed unit (S203). More specifically, in step S203, the CPU 108 or the compression/expansion device 111 determines that the prescribed unit has been reached if expansion processing for the compression block units 204 is complete.

If it is determined in step S203 that the compressed data has reached the prescribed unit, the CPU 108 or the compression/expansion device 111 determines whether the expansion of the whole target area of the expansion target data is complete (S204). If, on the other hand, it is determined in step S203 that the compressed data has not reached the prescribed unit, the CPU 108 or the compression/expansion device 111 returns to step S202 and continues the expansion processing.

If it is determined in step S204 that the expansion of the whole target area of the expansion target data is incomplete, the CPU 108 sets the dictionary at an initial value (S205), sets the expansion processing pointer in the prescribed position of the next compression block unit 204 (S206), and executes the expansion processing of step S202. Here, the processing to set the dictionary at an initial value in step S205 may be the same processing as initialization of the dictionary in step S200 or may be different processing.

If it is determined in step S204 that expansion of the whole target area of the expansion target data is complete, the CPU 108 completes the expansion processing (S204).

(1-3-4) Compression Management Table

The foregoing compression management table 400 will be described next. The compression management table 400 is a table for managing the position of compressed data and, as shown in FIG. 9, is configured from a pre-compression start address field 401, a pre-compression size field 402, a post-compression start address field 403, and a post-compression storage size field 404.

The pre-compression start address field 401 stores the start address of the pre-compression data. The pre-compression size field 402 stores the size of the pre-compression data. Note that, if the pre-compression size is set at a fixed value, the pre-compression size field 402 need not be set in the compression management table 400.

The post-compression start address field 403 stores the post-compression start address. The post-compression storage size field 404 is configured from a plurality of compression block position fields 405. The compression block position field 405 stores a value indicating up until which position in the compression target data 200 the corresponding compression block units 204 are compressed and stored. The value stored in the compression block position field 405 may be a value indicating the position of the compression target data 200 or a value indicating the size of the compressed data stored in the compression target data 200. Further, if the compression target data 200 is not stored in the corresponding compression block units 204, [the compression block position field 405] stores a zero value or a value indicating that the compression target data 200 is not stored. Another possible configuration involves waiting for a flag which indicates whether stored data has been compressed or determining whether compression has been performed at a time point when an address search is performed.

In addition, the number of compression block position fields 405 is determined from the number of compression block units 204 if the compressed data management units 203 are divided by the compression block units 204. However, if, as a result of the compression, the compression target data 200 is stored and set as uncompressed data when the data is stored in the final compression block unit 204, the data item in the compression block position field 405 corresponding to the position of the final compression block unit 204 may be deleted from the compression management table 400.

If there is data write access by the host apparatus 101 to the stored compressed data 201, the access position can be specified, for each compression block unit 204, from the foregoing compression management table 400.

Figure 10:
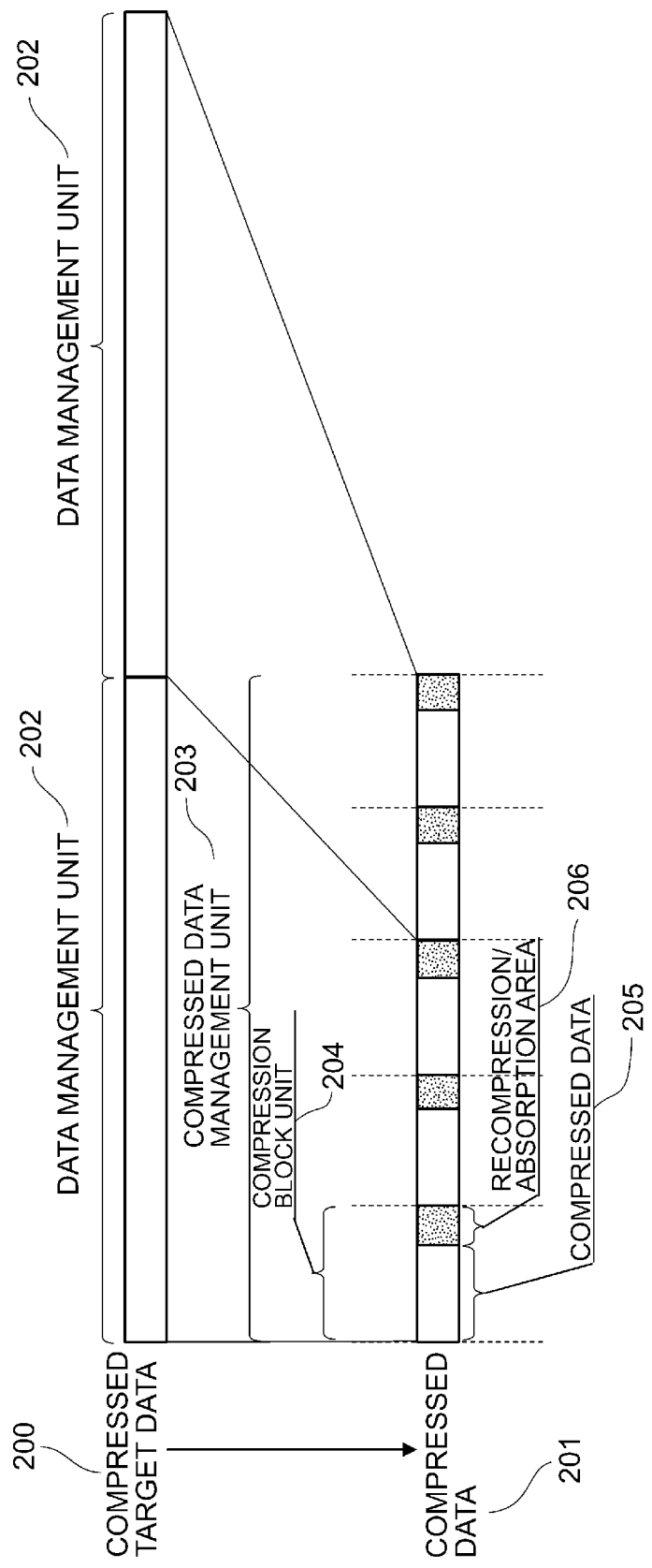
FIG. 10 is a conceptual diagram showing a compressed data structure according to this embodiment.

Further, as shown in FIG. 10, a plurality of data management units 202 can be stored in a single compressed data management unit 203 and, as shown in the compression management table 400 in FIG. 11, the start address 403 after compression of the same address can also be configured for a pre-compression start address 401 of a different compression size.

At this time, as shown in FIG. 11, the start position and size are configured in the compression management table 400 so that the division positions of the data management units 202 are known and, after expansion, data of a particular size starting from a particular position is discriminated.

Figure 12:
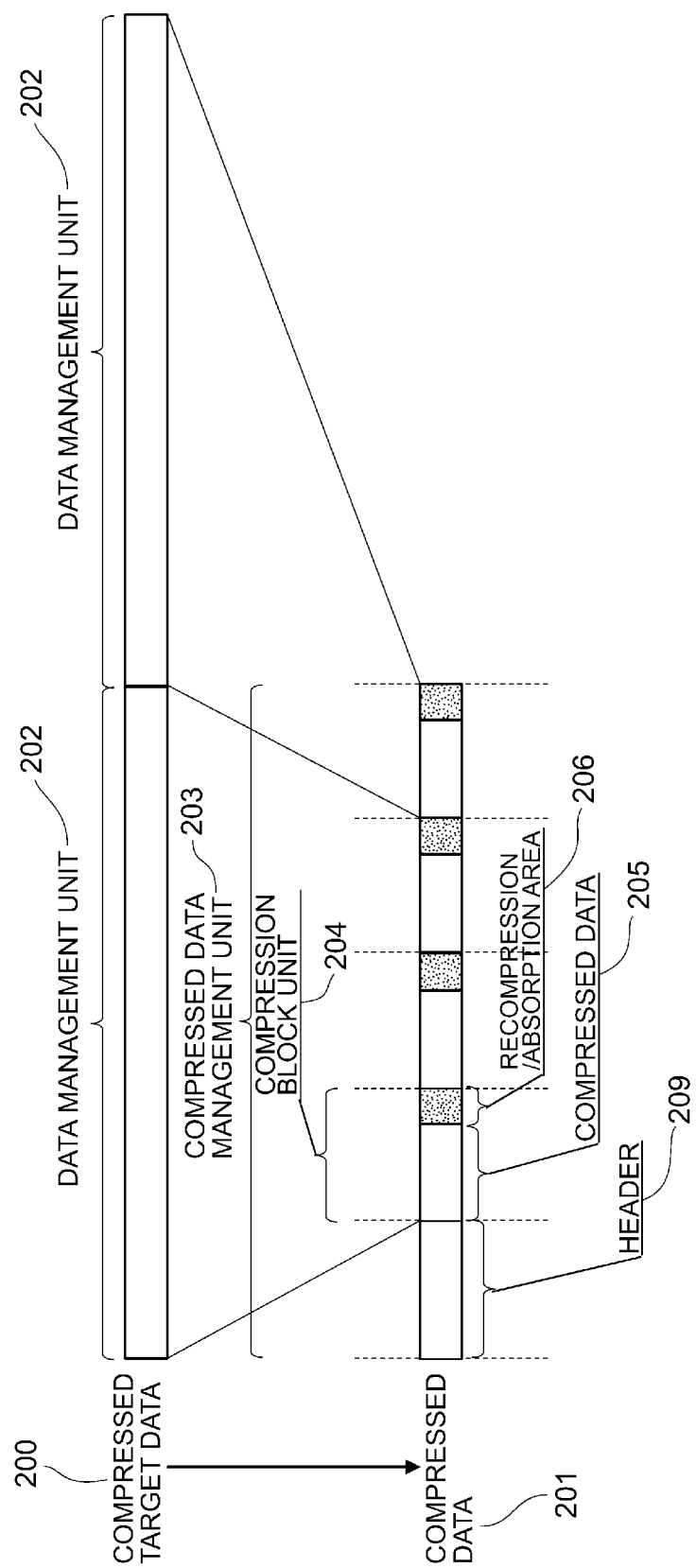
FIG. 12 is a conceptual diagram showing a compressed data structure according to this embodiment.

In addition, as shown in FIG. 12, the number of data management units 200 among the compression block units 202 or compressed data management units 203 as well as the respective post-expansion sizes are held as header information and, after the data of the post-compression start address 403 is read, the header information may be referenced to acquire each of the information items, and compression/expansion processing may be carried out.

Note that if, when rewriting is performed, the size of the recompression/absorption area 204 is exceeded, only the currently accessed data is migrated to another address and the data of the other address which is stored at the same time remains unaffected and a table update of another address stored at the same time is not carried out. Further, address information indicating which data at which address is contained is held in the header information, the address is reversed, and it is determined whether the corresponding data will remain in the same position or be moved together to another address, before performing a table update. A configuration is also possible where flag information indicating whether the data is compressed is contained as header information which is stored together with the data. Note that the header information may also be held in the compression management table 400.

In addition, as shown in FIG. 13, the data management units 202 may also be stored across two compressed data management units 203 and, in this case, two post-compression start addresses 403 are held. Note that, even if the data management unit 202 and the compressed data management unit 203 are the same, in a case where the compression rate is low and data with a low compression result is considered as uncompressed data, there may be two post-compression start addresses 403, and if the compressed data management unit 203 is smaller than the data management unit 202, a configuration with three or more is also possible.

(1-3-5) Compressed Data Rewrite Processing

Figure 14:
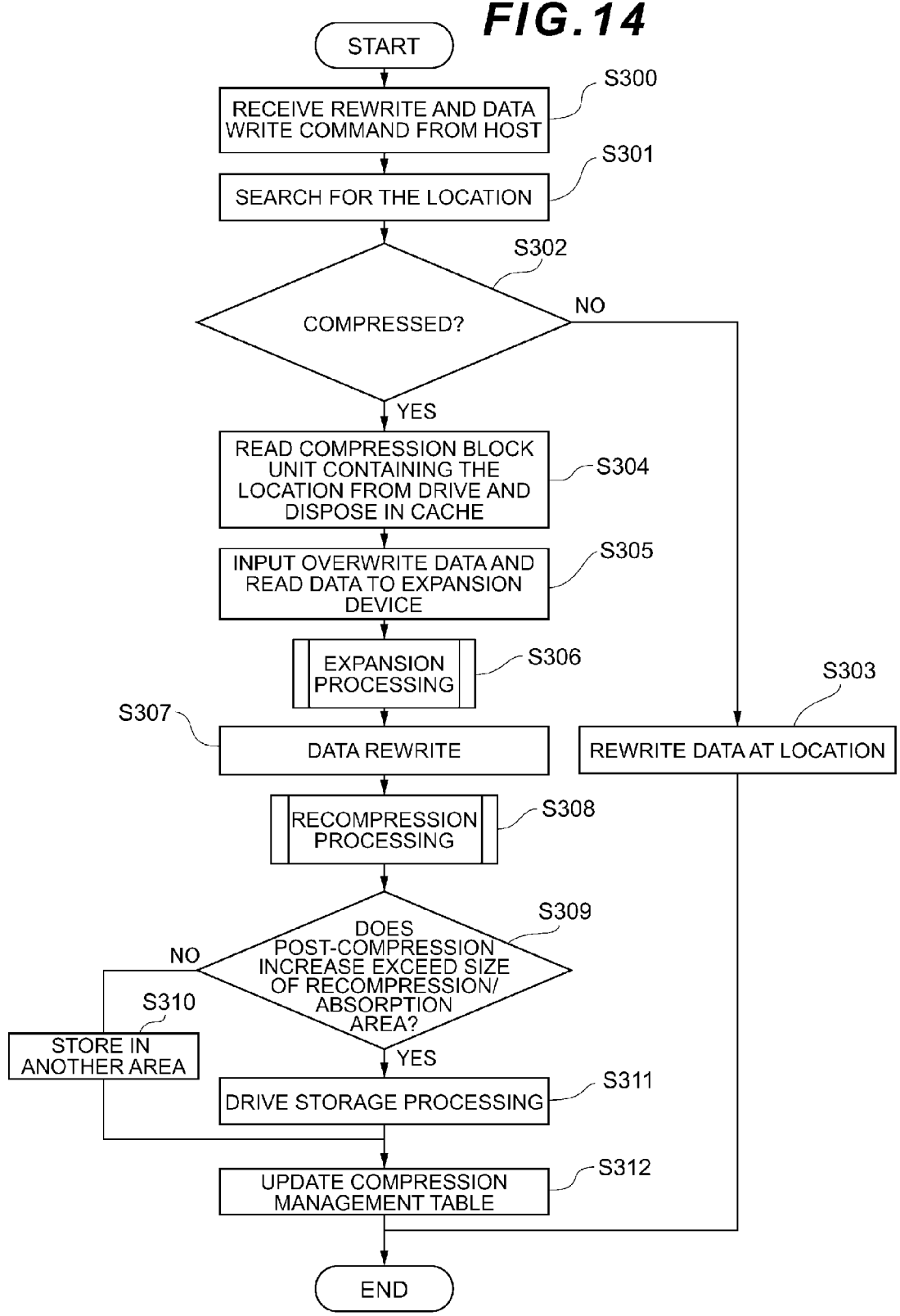
FIG. 14 is a flowchart showing the flow of compressed data rewrite processing according to this embodiment.

Compressed data rewrite processing will be described next. FIG. 14 is a flowchart showing compressed data rewrite processing. When compressed data rewrite processing is described, reference is also made to an explanatory diagram providing an overview of the compressed data rewrite processing of FIG. 15.

As shown in FIG. 14, the data transfer controller 112 of the storage apparatus 103 receives a partial rewrite command and a data write command for stored data from the host apparatus 101 (S300). The CPU 108 or the compression/expansion device 111 of the storage apparatus 103 then refers to the compression management table 400 to search for the location corresponding to the rewrite command received in step S300 (S301).

The CPU 108 or compression/expansion device 111 determines whether the data at the location sought in step S301 is compressed (S302). If it is determined in step S302 that the data at this location has been compressed, the CPU 108 or the compression/expansion device 111 executes the processing of step S304 and subsequent steps. If, on the other hand, it is determined in step S302 that the data at this location has not been compressed, the CPU 108 or the compression/expansion device 111 rewrites data at that location (S303) and completes the rewrite processing.

Further, if it is determined in step S302 that the data at that location has been compressed, the CPU 108 or the compression/expansion device 111 reads the data in the compression block unit 204 including that location from the drive device 105 and places the data in the cache memory 110 (S304). If the rewrite target data straddles a plurality of compression block units 204 in step S304, the CPU 108 or the compression/expansion device 111 then reads data in an amount corresponding to the compression block units 204.

Further, the CPU 108 or the compression/expansion device 111 inputs the data of the read compression block unit 204 together with the rewrite data 500 transmitted from the host apparatus 101 to the compression/expansion device 111 (S305). The CPU 108 or the compression/expansion device 111 causes the compression/expansion device 111 to execute expansion processing of the data in the compression block units 204 input in step S305 (S306).

After expanding the data of the compression block units 204 in step S306, the compression/expansion device 111 uses the rewrite data 500 transmitted from the host apparatus 101 to rewrite the location of the expanded data 501 (S307).

The compression/expansion device 111 then executes recompression processing (S308). Here, the expansion processing of step S306 and the recompression processing of step S307 are similar to the foregoing expansion processing and compression processing and hence a detailed description will be omitted. If the size of the recompression data 502 recompressed in step S308 has increased to exceed the data size of the rewrite target compression block unit 204 prior to rewriting, the compression/expansion device 111 absorbs the increase by using the recompression/absorption area 206.

After the recompression processing is executed by the compression/expansion device 111 in step S308, the CPU 108 or the compression/expansion device 111 determines whether the increase in the data following recompression exceeds the size of the recompression/absorption area 206 (S309).

If it is determined in step S309 that the increase in the data after recompression exceeds the size of the recompression/absorption area 206, the CPU 108 or the compression/expansion device 111 stores the recompressed data in an area distinct from the area where the original compressed data is stored (S310). Here, not only surplus compression block units but also compressed data management units or data management units which include the surplus compression block units may each be migrated to and stored in another area. This results in consecutive storage of continuous data and the access response performance improves.

The CPU 108 or the compression/expansion device 111 then updates the compression management table 400 (S312) and completes the compressed data rewrite processing. When the recompressed data is stored in the other area in step S310, the CPU 108 may read and redispose all the compressed data 201 or may store this data in the other area only in the compression block unit 204 of this location. Furthermore, management may be performed using the compression management table 400 to determine, in the determination of step S309, how many times the compression block unit 204 at the same location will be rewritten. For example, if the compression block unit 204 at the same location are rewritten once or more, the CPU 108 may store all the compressed data 201 in another area, and may determine that the data is high access frequency data and store the data as uncompressed data.

If, on the other hand, it is determined in step S309 that the recompressed data 502 has been absorbed using the recompression/absorption area 206, the CPU 108 stores the data in the area where the original compressed data was stored (S311), updates the compression management table (S312), and completes the compressed data rewrite processing.

Figure 15:
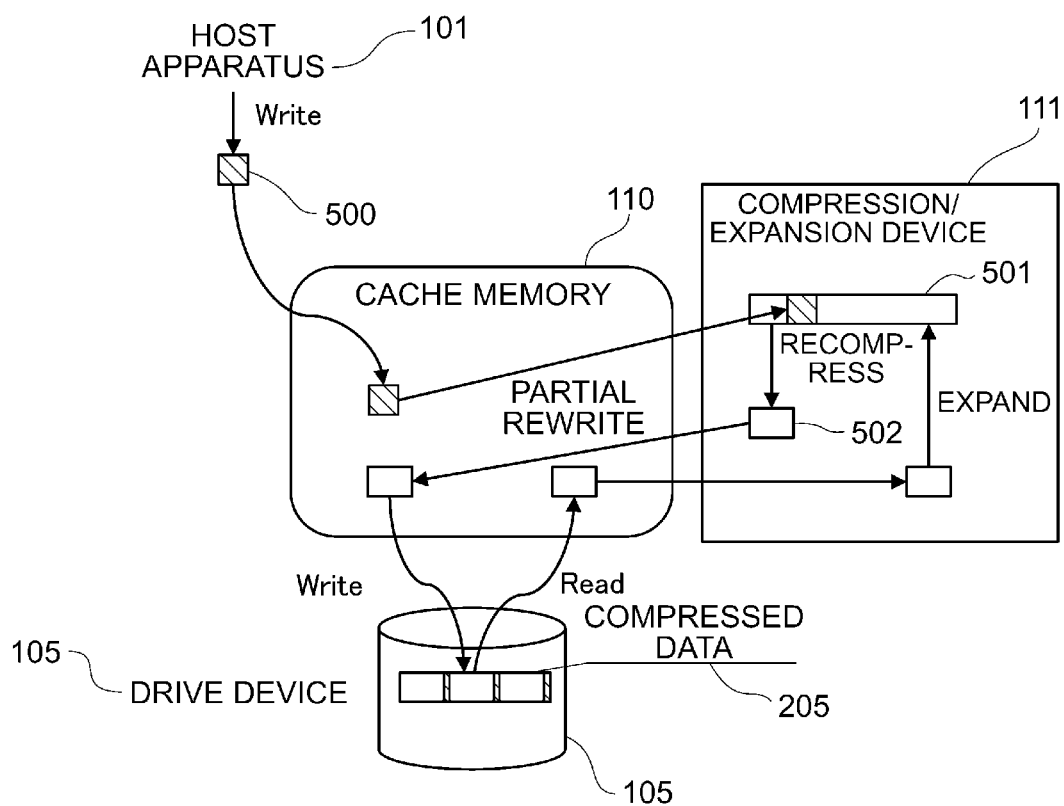
FIG. 15 is a conceptual diagram showing an overview of compressed data rewrite processing according to this embodiment.

An example of an overview of the foregoing compressed data rewrite processing is shown in FIG. 15. In FIG. 15, write access of partial rewrite data 500 by the host apparatus 101 is issued and the compression block unit 204 containing the compressed data 205 is expanded by the compression/expansion device 111. Further, it can be seen that the expanded expansion data 501 is rewritten using the rewrite data 500 and that the recompression processing is executed by the compression/expansion device 111 and stored in the original storage location.

(1-3-6) Recompression Determination Processing

Figure 16:
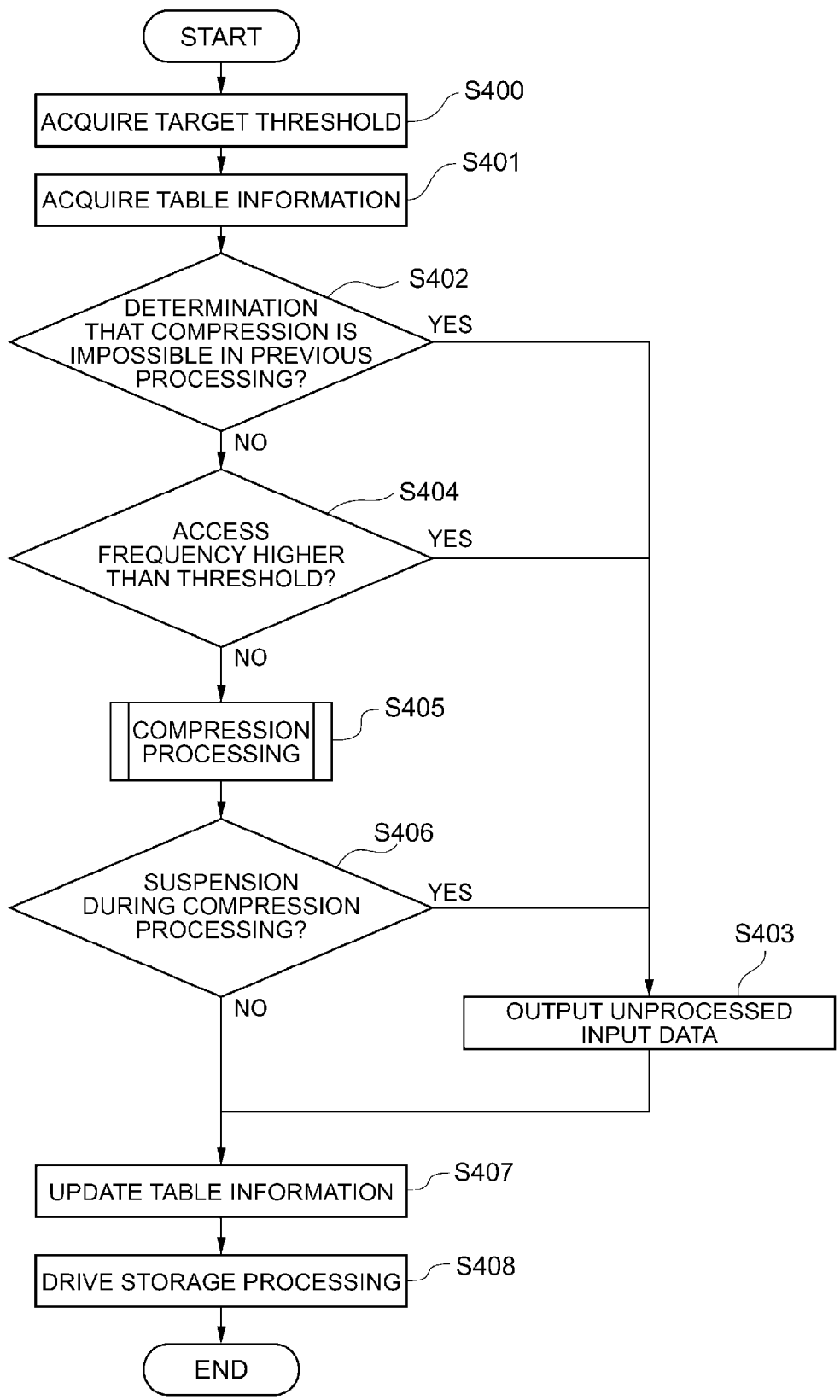
FIG. 16 is a flowchart showing the flow of compression determination processing according to this embodiment.

Next compression determination processing will be described in which, when compression processing is to be executed, it is determined whether to execute compression processing or whether data before execution of the compression processing will be stored without executing the compression processing. As shown in FIG. 16, the CPU 108 or the compression/expansion device 111 first acquires a target threshold for the access frequency (S400).

Further, the CPU 108 or the compression/expansion device 111 acquires table information relating to the compressed data (S401). Here, compression-related table information means the compression management table 400 shown in FIG. 9 and a compression information table 601 which will be described subsequently, or the like. The compression information table 601 will be described in detail hereinafter.

The CPU 108 or the compression/expansion device 111 then refers to table information relating to compressed data acquired in step S401 to determine whether the previous processing yields a determination that the data cannot be compressed (S402).

If it is determined in step S402 that the previous processing yields a determination that the data cannot be compressed, the CPU 108 or the compression/expansion device 111 outputs input data as is without compression (S403).

If, on the other hand, it is determined in step S402 that the data can be compressed or that compression processing will first be executed and the information of the data is not in the table, the CPU 108 or the compression/expansion device 111 determines whether the access frequency is higher than the threshold set in step S400 (S404).

Further, if it is determined in step S404 that the data is data for which compression processing is to be executed first, the CPU 108 or the compression/expansion device 111 causes the compression/expansion device 111 to execute compression processing (S405). If, on the other hand, it is determined in step S404 that the data has an access frequency which is higher than the set threshold, the CPU 108 or the compression/expansion device 111 outputs the input data as is without compression (S403). Details of the compression processing of step S405 will be provided next with reference to FIG. 17.

Figure 17:
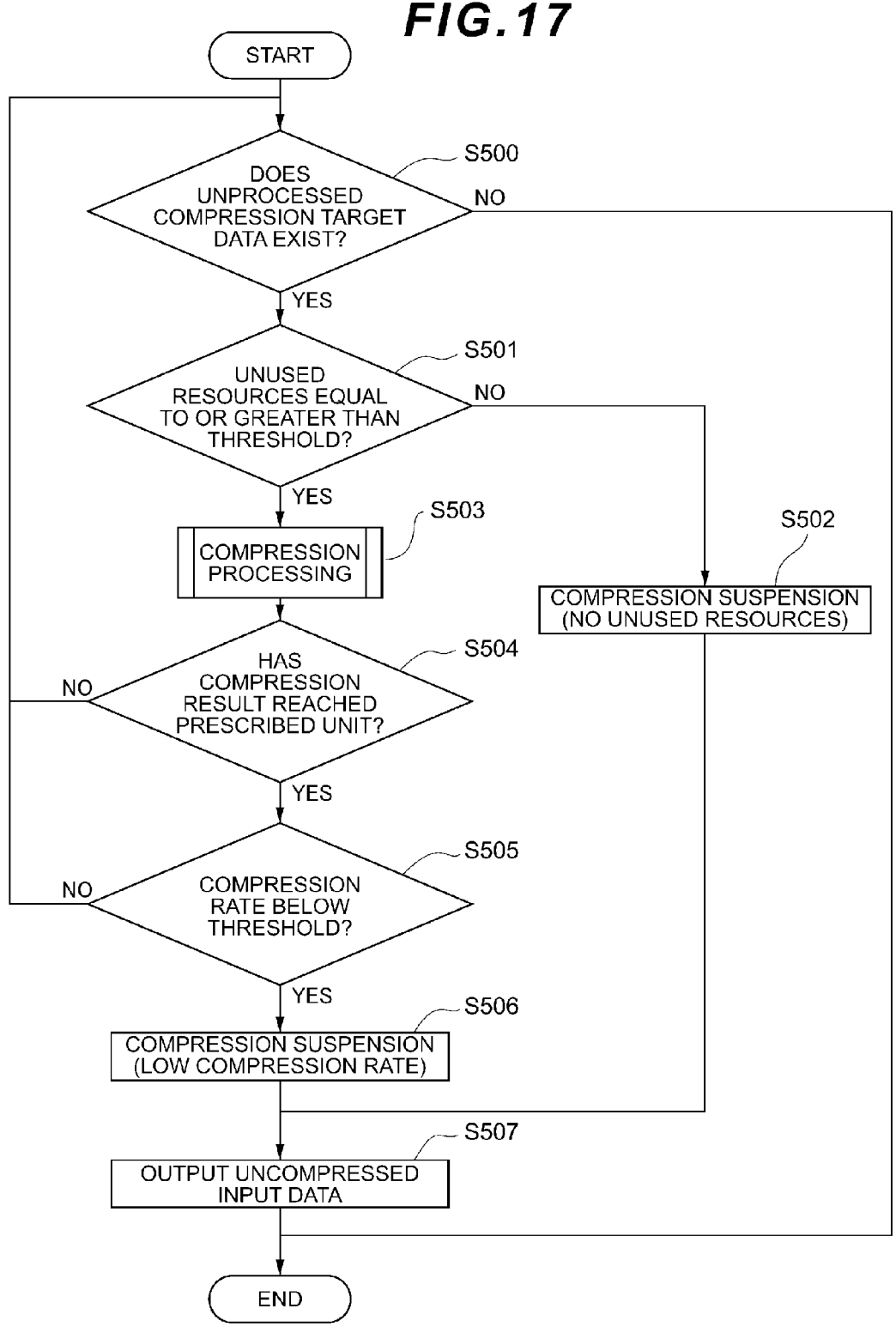
FIG. 17 is a flowchart showing the flow of compression processing according to this embodiment.

FIG. 17 shows details of the compression processing which is executed by the compression/expansion device 111 in step S405 of FIG. 16. As shown in FIG. 17, the compression/expansion device 111 starts the compression processing and first determines whether unprocessed compression target data exists (S500).

If it is determined in step S500 that unprocessed compression target data does not exist, the compression/expansion device 111 ends the compression processing. If, on the other hand, it is determined in step S500 that unprocessed compression target data exists, it is determined whether unused resources exceed the preset threshold (S501). Here, unused resources means the processing power with which the compression/expansion device 111 executes compression processing. For example, a case may be cited where compression processing of other data or the like is being executed or where there are insufficient resources for executing the compression processing.

If the unused resources do not exceed the preset threshold in step S501, that is, if there are insufficient unused resources to execute the compression processing, the compression/expansion device 111 suspends the compression processing (S502) and outputs uncompressed data. If the compression processing is suspended in step S502, information indicating that compression processing has been suspended due to insufficient resources is stored in the compression information table 601 which is described subsequently.

If it is determined in step S501 that unused resources exceed the preset threshold, the compression/expansion device 111 executes compression processing (S503). Further, the compression/expansion device 111 determines whether the compression result has reached a prescribed unit (S504). [The compression/expansion device 111] determines whether, as a result of executing compression processing in step S503, the compressed data has reached a value corresponding to a size obtained by removing the recompression/absorption area 206 from the compression block unit 204 which is the prescribed unit.

If it is determined in step S504 that the compression result has reached the prescribed unit, the compression/expansion device 111 determines whether the compression rate is below a threshold (S505). Here, the compression rate is a preset value, for example, the compression rate threshold is set at 90% (here, because compression to a certain % size relative to the original size is called the compression rate, the smaller the number, the higher the compression). If the compression rate is higher than a threshold in step S505 (if the compression rate is 70%, for example), it can be determined that the compression result is high. If, on the other hand, the compression rate is below a threshold in step S505 (the compression rate is 100%, for example), it can be determined that there is no compression result.

If, on the other hand, it is determined in step S504 that the compression result has not reached the prescribed unit, the compression/expansion device 111 repeats the processing of steps S500 to S505 until the compression result reaches the prescribed unit.

If it is determined in step S505 that the compression rate is higher than the threshold, that is, that the compression result is high, the compression/expansion device 111 determines in step S500 that there is no unprocessed compression target data and ends the processing.

If, on the other hand, it is determined in step S505 that the compression rate is below the threshold, that is, that there is no compression result, the compression/expansion device 111 suspends the compression processing since the compressed data has a low compression rate (S506) and outputs unprocessed data (S507). If the compression processing is suspended in step S506, the compression/expansion device 111 stores information, which indicates that the compression processing has been suspended due to the low compression rate, in the compression information table 601, described subsequently. The above processing is repeated until there is no more unprocessed compression target data.

Returning to FIG. 16, when the compression processing of step S405 is complete, the CPU 108 or the compression/expansion device 111 determines whether the compression processing has been suspended during compression processing of step S504 (S406).

If it is determined in step S406 that the compression processing has been suspended, the CPU 108 or the compression/expansion device 111 outputs the unprocessed input data (S403). If, on the other hand, it is determined in step S406 that the compression processing has not been suspended, the CPU 108 or the compression/expansion device 111 updates the various table information relating to the compressed data (S407) and executes drive storage processing (S408).

(1-3-7) Compression Information Table

Figure 18:
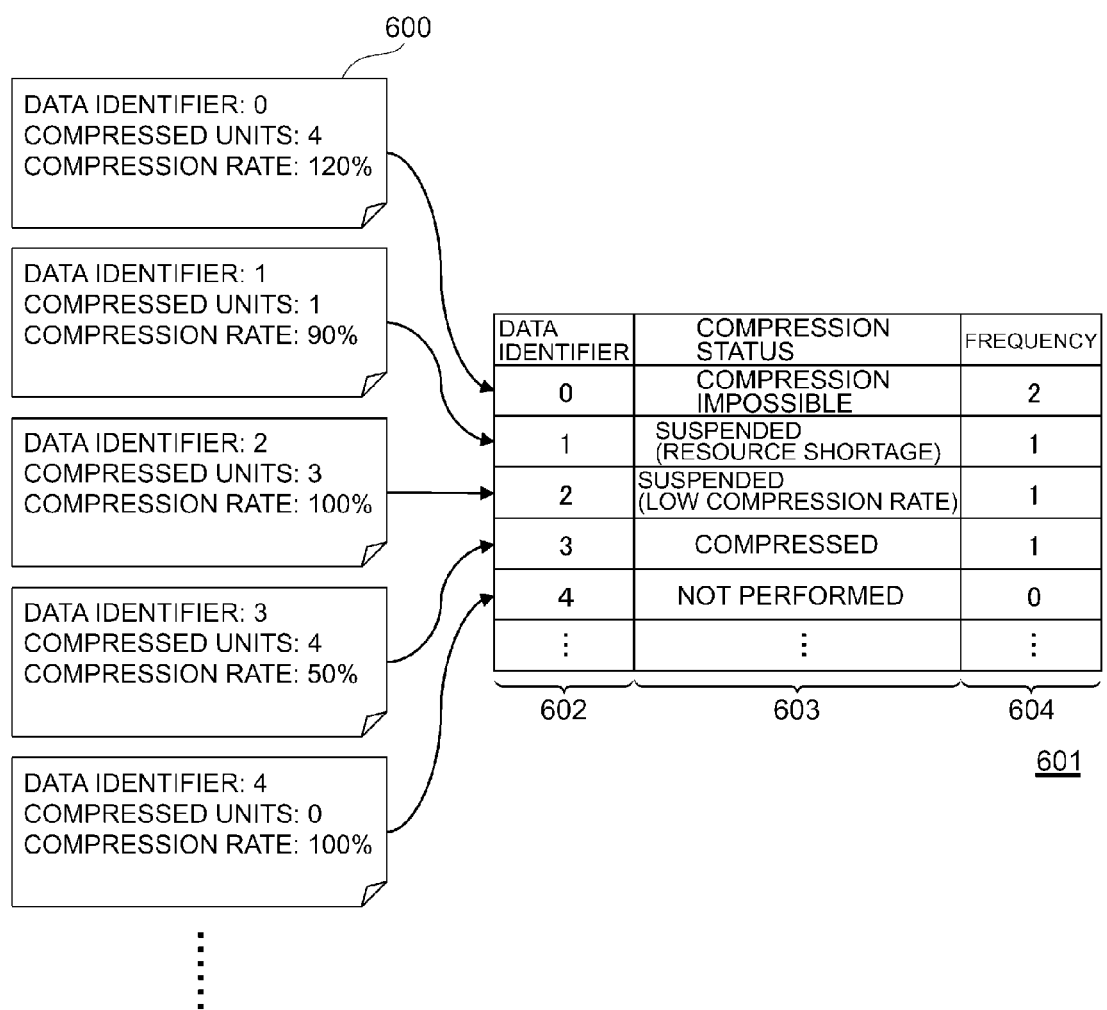
FIG. 18 is a table showing the content of a compression information table according to this embodiment.

The compression information table 601 which is used in the above compression determination processing will be described next. The compression information table 601 is a table for managing the result of the compression processing which is executed by the compression/expansion device 111 and, as shown in FIG. 18, is configured from a data identifier field 602, a compression status field 603, and a frequency field 604.

The data identifier field 602 stores identification information which is configured for each unit where data is managed. Data identifiers may also store values which are stored in the post-compression start address field 403 of the compression management table 400, for example. The compression status field 603 stores information indicating the status of the compressed result. The frequency field 604 stores information on the access frequency indicating how many times the data has been accessed, which is used in the above compression determination processing.

The result of the compression processing executed by the compression/expansion device 111 will now be described using the compression processing implementation result 600. When, as a result of the compression processing, the compression processing implementation result 600 is affirmative, the CPU 108 or the compression/expansion device 111 updates the compression information table 601.

For example, in the case of data for which the value stored in the data identifier field 602 is 0, four compression block units 204, which are the compressed units, comprise a single compression data management unit 203. In this case, it can be seen from the compression processing implementation result 600 that processing is complete up to and including the fourth compression block unit 204. Further, because the compression rate is then 120%, it is clear that the data is larger than the original data. The compression status field 603 for data for which a zero value is stored in the data identifier field 602 stores a value indicating that compression is impossible.

Similarly, for data for which the value stored in the data identifier field 602 is 1, although processing has run until the first compression block unit 204 and the compression rate is 90%, the compression processing is suspended due to a lack of unused resources based on the foregoing compression determination processing. In this case, the compression status field 603 stores information indicating suspension (suspension (shortage of resources)).

In addition, regarding data for which the value stored in the data identifier field 602 is 2, a low compression rate has been determined from the foregoing compression determination processing, and hence the compression status field 603 stores information that the compression processing is suspended. Furthermore, for data for which the value stored in the data identifier field 602 is 3, compression processing has been executed including the final data, yielding an adequate compression result, and hence the compression status field 603 stores information indicating that [the data is] compressed. Further, regarding data for which the value stored in the data identifier field 602 is 4, the compression status field 603 stores information showing that that the data has not yet undergone the compression processing itself.

(1-3-8) Compression Method Selection Screen

In the foregoing, as shown in step S502 of FIG. 17, if the unused resources for executing the compression processing are inadequate, the compression processing is suspended. Thus, if resources are insufficient, it is possible to prevent a drop in the total throughput of the storage apparatus 103 by suspending the compression processing because compression processing takes time. However, if the storage capacity of the storage apparatus 103 is small, there may be a desire to reduce the amount of data stored in the storage area by compressing the data despite a drop in the total throughput of the storage apparatus 103.

Figure 19:
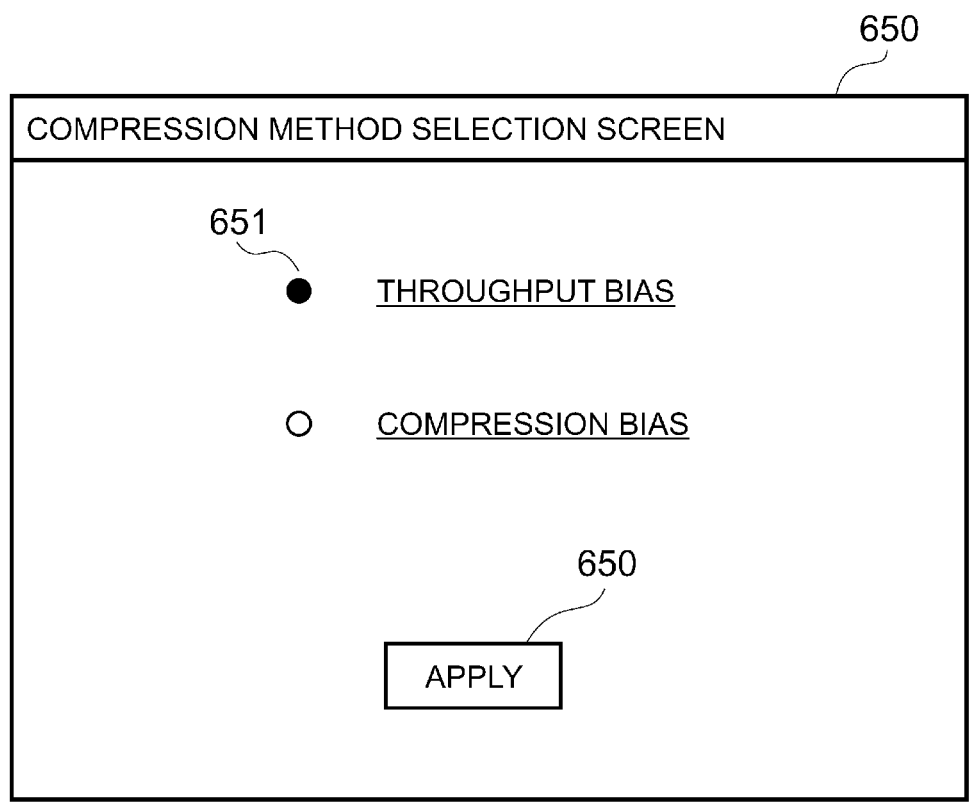
FIG. 19 is a conceptual diagram showing an example of a compression method selection screen according to this embodiment.

Therefore, for example, the data compression method may also be selected by the system administrator or similar via a compression method selection screen 650 which is shown in FIG. 19. When compression processing is executed, the compression method selection screen 650 contains radio buttons 651 for selecting either a throughput bias or a compression bias, and an apply button 652. The system administrator selects either radio button 651 for a throughput bias or compression bias, displayed on the compression method selection screen 650, and pushes the apply button 652.

For example, if the throughput bias is selected by the system administrator, the compression processing is suspended when the resources for compression processing are inadequate at the time compression processing is executed. Further, if the compression bias is selected by the system administrator, even when there are inadequate resources for compression processing at the time the compression processing is executed, rather than suspending the compression processing, unused resources for the compression processing are awaited and the compression processing is performed.

(1-3-9) Occasions when Compression Processing is Performed

The timing with which the foregoing compression processing is executed will be described next. Occasions when compression processing is executed include when destaging is performed from the cache memory 110 in the controller device 104 to the drive device 105, for example. At this time, compression processing is executed in accordance with the foregoing compression determination processing.

Examples of where destaging from the cache memory 110 to the drive device 105 occurs include a case where the capacity of the cache memory 110 is tight or where there is no access to the data of the cache memory 110.

If the capacity of the cache memory 110 is tight, because performing destaging rapidly brings about a drop in the overall performance of the storage apparatus, a threshold is set which is stricter than the threshold set for the foregoing compression determination processing. For example, destaging is performed without performing compression processing and with uncompressed data remaining even when unused resources are equal to or greater than the threshold set in the compression determination processing.

Also for the access frequency, a threshold may be set which is stricter than the threshold set in the foregoing compression determination processing so that compression processing is not executed when the access frequency is low, thereby shortening the destaging time. Likewise also for the compression rate threshold, even if the upper limit for the compression rate threshold is about 90%, for example, in the foregoing compression determination processing, execution of the compression processing may be avoided upon determining a low compression rate in cases where the compression rate is no more than a newly set threshold (compression rate of 70%, for example) by setting the upper limit for the compression rate threshold at about 60%.

Figure 20:
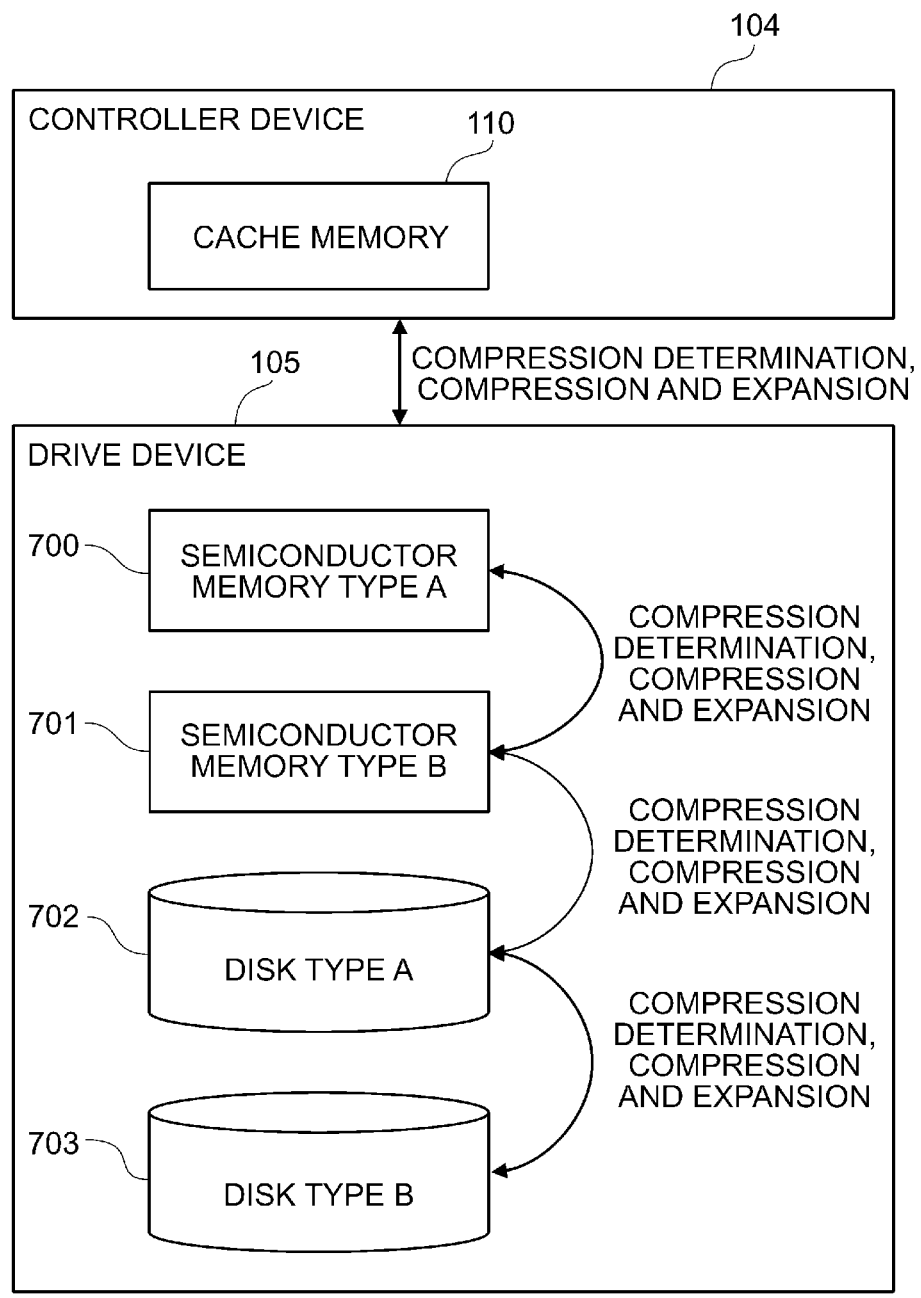
FIG. 20 is a conceptual diagram providing an overview of how the compression processing according to this embodiment comes to be executed.

Furthermore, other occasions when compression processing is executed include during hierarchical migration in the drive device 105 according to the foregoing hierarchical data management method. As shown in FIG. 20, for example, the drive device 105 comprises a semiconductor memory TYPE A700, a semiconductor memory TYPE B701, a disk TYPE A701, and a disk TYPE B702. For example, the disk TYPE A701 may be represented by a SAS (SERIAL ATTACHED SCSI) and the disk TYPE B702 may be represented by a SATA (SERIAL ATA) and so on.

High-performance memory and disks have a limited capacity due to their high cost, and enable hierarchical migration of data in a certain fixed period. In this embodiment, compression processing is executed on the occasion of this hierarchical migration. Further, compression takes place when data which is uncompressed in a Type A700 SAS, for example, is migrated to a Type B701 SATA. In cases where the data is stored in a SAS or where the data stored in the SAS is rewritten and stored once again in the SAS, the data stored in the SAS has a high access frequency and is therefore stored while still uncompressed. However, in a case where the access frequency of the data stored in the SAS is low and the data is migrated to a lower-tier SATA by tier migration processing, compression processing is performed on the data as a result of the compression determination processing. Accordingly, in cases where, after data is stored, the access frequency of the data is determined as being low, the compressed data is stored in a low cost SATA. The drive device 105 can thus be used effectively.

Furthermore, otherwise, the following occasions when compression processing is performed may be cited. For example, when destaging from the cache memory 110 in the controller device to the drive device 105. Other occasions also include at the time of data reading and writing from/to the host apparatus 101, when setting the cache memory 110, before intermediate dirty migration in the cache memory, before physical dirty migration, before cleaning, when migrating or copying to semiconductor memory, when migrating or copying to disk, during semiconductor- and disk storage tier migration, during cache migration or copying to another controller, when migrating or copying to another drive, when migrating or copying to another storage, and when remote-copying, and so on.

(1-4) Compression/Expansion Device Disposition

Figure 21:
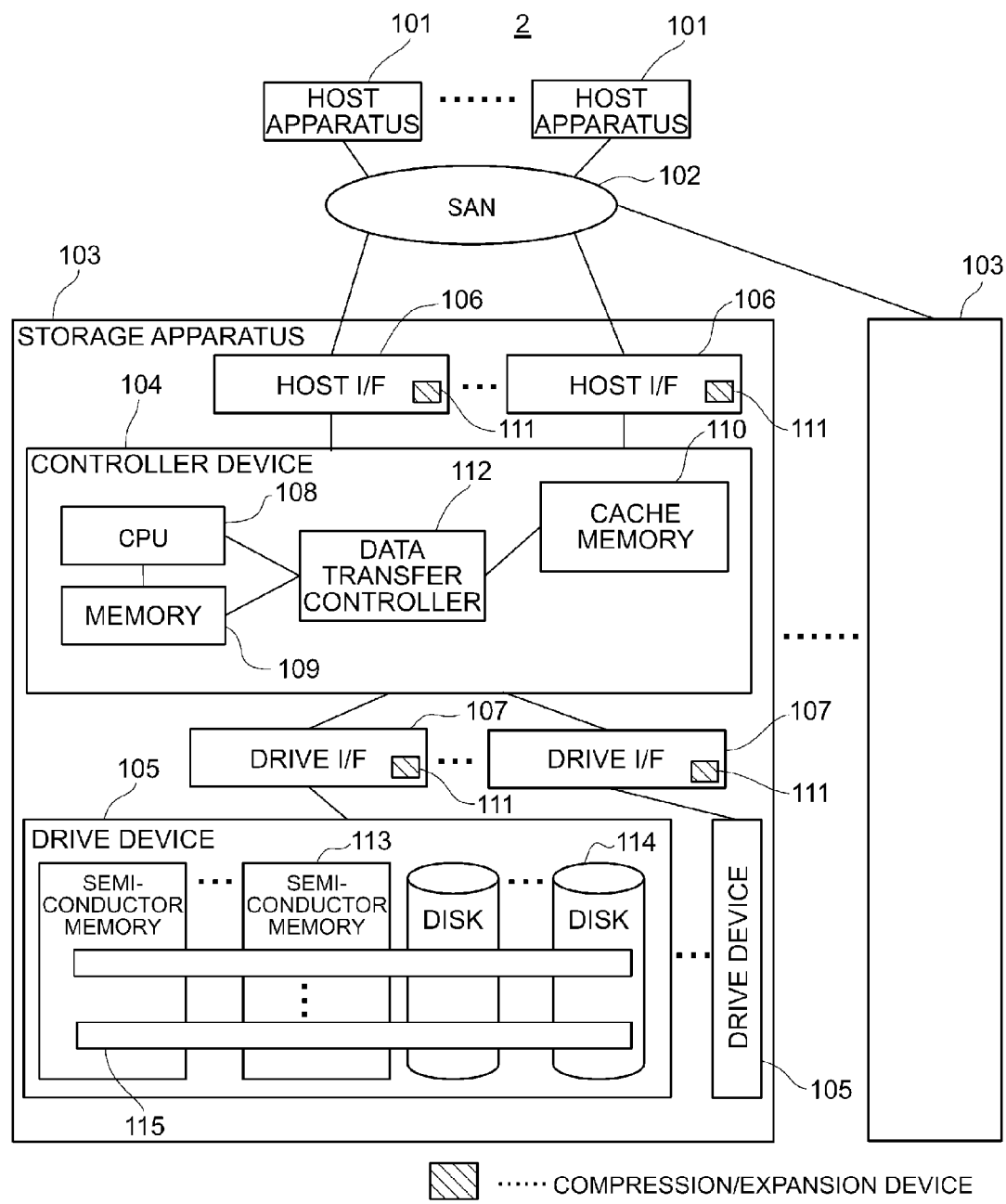
FIG. 21 is a conceptual diagram illustrating the disposition of the compression/expansion device according to this embodiment.
Figure 22:
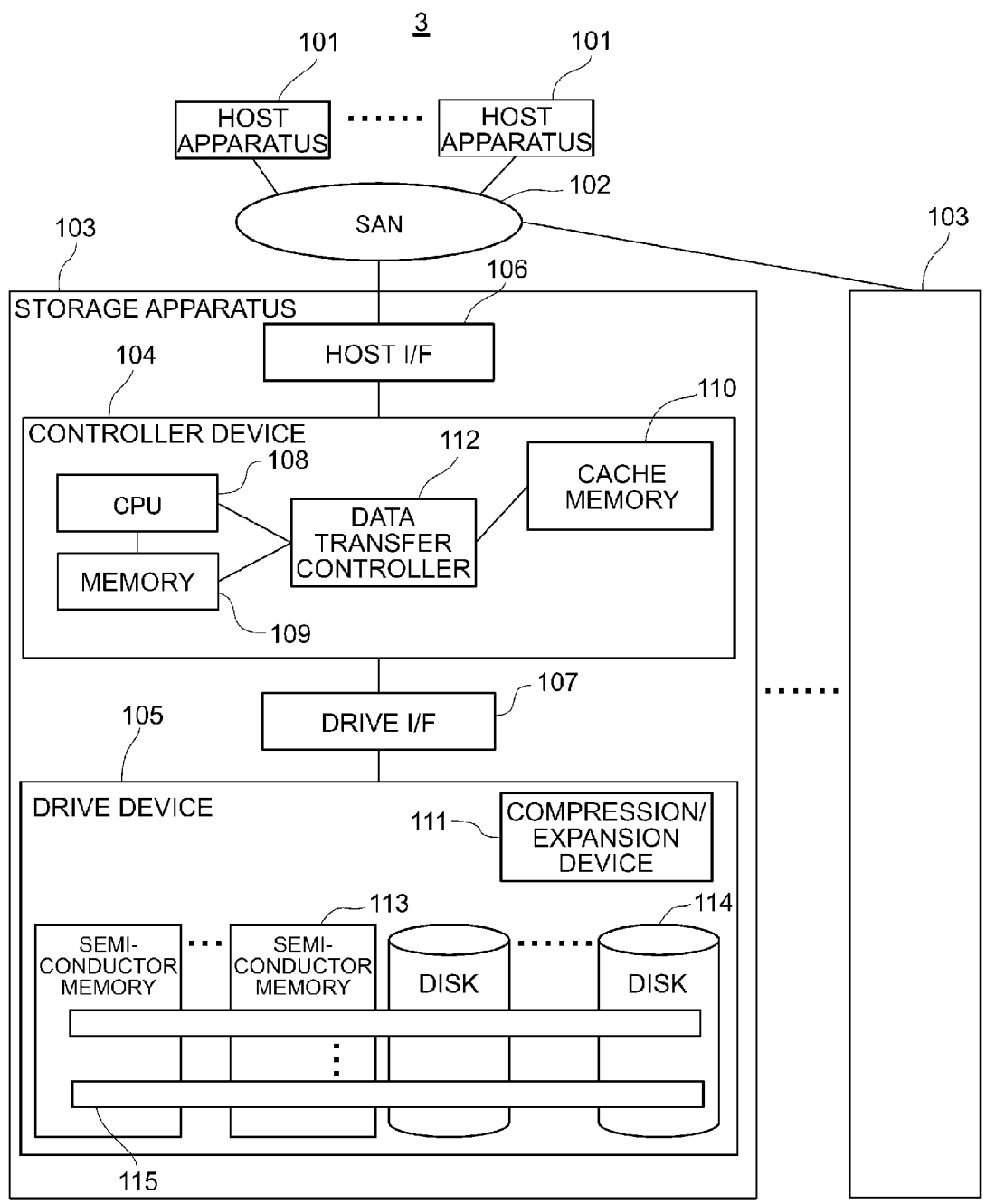
FIG. 22 is a conceptual diagram illustrating the disposition of the compression/expansion device according to this embodiment.

As shown in FIG. 1, hereinabove, the position in which the compression/expansion device 111 is disposed is inside the controller device 104 in FIG. 1, but the embodiment is not limited to this example. For example, the compression/expansion device 111 may also be disposed in a plurality of host I/F 106 and drive I/F 107 as shown in FIG. 21. Further, the compression/expansion device 111 may also be disposed in the drive device 105 as shown in FIG. 22. In a case where the controller device 104 and the drive device 105 exist in a plurality in a single storage apparatus 103, the compression/expansion device 111 may be disposed in each controller device 104 and each drive device 105.

Furthermore, if a plurality of compression/expansion devices 111 are provided, compression and expansion processing may be carried out in distributed form. For example, in a case where data is stored in the cache memory 110 via the host interface 106 and compression processing is performed on the data, the compression processing may also be shared between the plurality of compression devices. For example, the data in the cache memory 110 is distributed between unused compression devices on processing standby and compression processing is executed. Here, the unused resources determined in the foregoing compression determination processing may represent the unused compression devices on processing standby. The operations to handle such processing may be carried out similarly for expansion processing. If a plurality of compression/expansion devices 111 are used, the processing load can be distributed and therefore the compression and expansion performance can be improved even when the individual compression/expansion devices 111 exhibit a low performance. Accordingly, the circuit scale and processing program scale of the compression/expansion device 111 can be reduced to enable cost reductions.

(1-5) Effect of the Embodiment

With the above embodiment, data is compressed by the compression/expansion device 111 and the compressed data 205 is added to the recompression/absorption area 206 and managed as a compression block unit 204. As a result, when a portion of the data is rewritten, the data can be rewritten by reading but not expanding all the compression target data, or expanding the data by reading the data one compression block unit at a time, thereby permitting efficient data rewriting and recompression processing and reducing the processing load.

(2) Second Embodiment (2-1) Overview of Embodiment

In this embodiment, compressed data is generated by means of a compressed data structure which differs from that of the first embodiment. Hereinbelow, a configuration which differs from that of the first embodiment will be described in particular detail, while a detailed description of configurations which are the same as those of the first embodiment will be omitted.

(2-2) Compressed Data Structure

Figure 23:
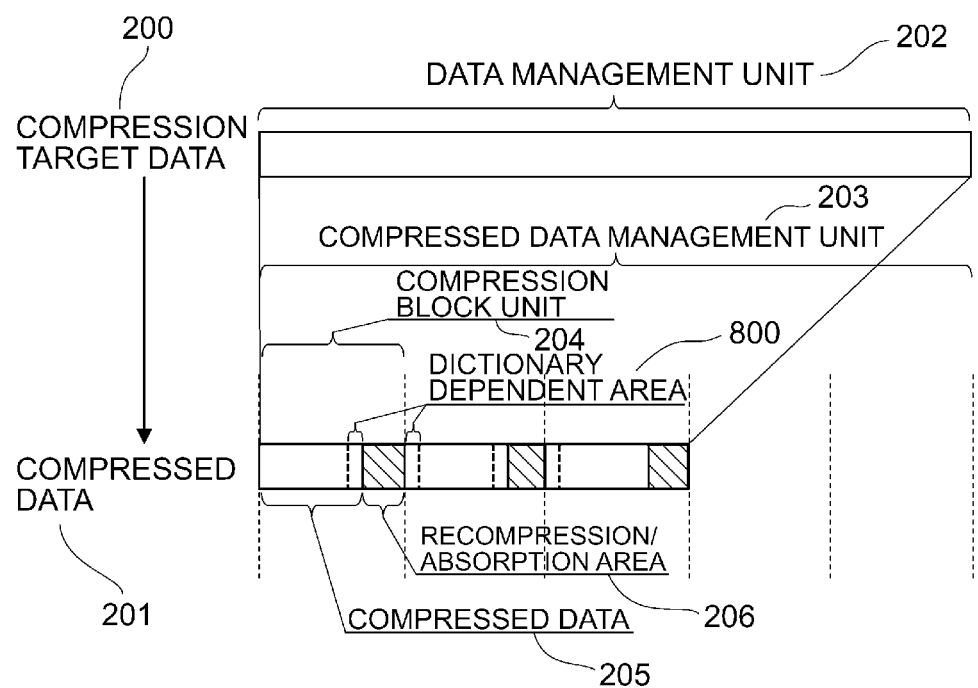
FIG. 23 is a conceptual diagram showing a compressed data structure according to a second embodiment of the present invention.

A compressed data structure which differs from that of the first embodiment will be described hereinbelow. FIG. 23 shows the compressed data structure of this embodiment.

As shown in FIG. 23, if write access by the host apparatus 101 is issued, among the data which is written to the drive device 105 in the storage apparatus 103, the compression target data is the compression target data 200. When the compression target data 200 is compressed by the compression/expansion device 111, the structure of the compressed data 201 is generated. The structure of the compressed data 201 is the same as the compressed data structure in FIG. 5 which was described in the first embodiment, except for a dictionary dependent area 800. The dictionary dependent area 800, which differs from that of the first embodiment, will be described in detail hereinbelow.

The dictionary dependent area 800 is an area for establishing a dictionary dependent relationship for each of the compression block units 204. The compression target data 200 is compressed beginning at the start, and a size is obtained by further subtracting the dictionary length from the size obtained by subtracting the recompression/absorption area 206 from the compression block unit 204, yielding a first dotted line position.

If compression processing is executed up to the first dotted line position, the compression/expansion device 111 proceeds with the compression, starting from the first dotted line, while retaining uncompressed data in an amount corresponding to the dictionary size. As a result, after the compression processing up until the compression/absorption area 206 is complete, the retained dictionary-dependent area data, disposed at the start of the remaining compression target data, is linked to the start of the data which follows, as indicated by the second dotted line part.

After linkage, the data compression processing is continued after the dotted line by taking the linkage point as the initial value of the dictionary. Accordingly, a partial rewrite of the compressed data is made possible by removing the dictionary dependency between the compression block units 204. Thus, in contrast to the first embodiment, in this embodiment, a structure affording a higher compression result is generated in cases where the dictionary generated using the dictionary dependent area 800 has a pattern which raises the compression rate of the data which follows.

(3) Further Embodiments

For example, each of the steps in the processing by the storage apparatus 103 of this specification need not necessarily be processed chronologically in the order laid out as a flowchart. In other words, each of the steps of the processing by the storage apparatus 103 may also be executed in parallel in different processing.

Computer programs for causing hardware such as a CPU, ROM, and RAM which are installed in the storage apparatus 103 or the like to exhibit the same functions as each of the configurations of the foregoing storage apparatus 103 can also be created. Furthermore, storage media for storing the computer programs may also be provided.

Furthermore, although, in the foregoing embodiments, the CPU 108 of the storage apparatus 103 realizes the various functions of the present invention on the basis of various programs stored in the storage apparatus 103, the present invention is not limited to such an example. For example, various functions may also be realized in cooperation with the CPU 108 by providing the CPU 108 in another device separate from the storage apparatus 103. Moreover, various functions may also be realized as a result of providing the various programs which are stored in the storage apparatus 103 in another device separate from the storage apparatus 103 and the programs being called up by the CPU 108.

REFERENCE SIGNS LIST

101 Host apparatus
103 Storage apparatus
104 Controller device
105 Drive device
106 Host interface
107 Drive interface
109 Memory
110 Cache memory
111 Compression/expansion device
112 Data transfer controller
113 Semiconductor memory
114 Disk
115 Logical volume
400 Compression management table
601 Compressed information table

The invention claimed is:

1. A storage apparatus which is connected via a network to a host apparatus which issues data I/O requests, comprising:
    a drive device configured to store data which is read/written by the host apparatus;
    a compression/expansion unit configured to compress the data using a predetermined algorithm to generate compressed data, and expand the compressed data; and
    a control unit comprising a CPU configured to control writing of data to the storage unit,
    wherein the control unit is configured to manage, as compression block units, divided compressed data which is obtained by dividing compressed data compressed by the compression/expansion unit into predetermined units, and padding data, and
    wherein, when the data is compressed by means of a coding system which uses sliding dictionary data, the compression/expansion unit is configured to generate the sliding dictionary data for each of the divided compressed data and discards the corresponding sliding dictionary data after generating the compression block unit.

2. The storage apparatus according to claim 1, wherein, when the data is compressed using dictionary data, the compression/expansion unit is configured to compress the data using new dictionary data for each of the divided compressed data.

3. The storage apparatus according to claim 1, wherein the control unit is configured to manage, in a compression management table and in the compression block units, storage information on pre-compression data in association with storage information on the divided compressed data after compression.

4. The storage apparatus according to claim 3, wherein the storage information on the pre-compression data of the compression management table comprises the start address of pre-compression data corresponding to the divided compressed data and the size of the pre-compression data, and
    wherein the storage information on the post-compression data comprises the start address of the divided compressed data and the size of the divided compressed data.

5. The storage apparatus according to claim 1, wherein the control unit is configured to manage, in a compression information table, the compression blocks in association with compression status information indicating whether the compression blocks have been compressed.

6. The storage apparatus according to claim 1, wherein, when a request to rewrite the divided compressed data is issued by the host apparatus, the compression/expansion unit is configured to expand the divided compressed data,
    wherein the control unit is configured to rewrite the divided compressed data thus expanded in accordance with the request, and
    wherein the compression/expansion unit is configured to recompress the divided compressed data which has been rewritten, and use a recompression/absorption area which is a storage area where the padding data is stored to store the recompressed divided compressed data.

7. The storage apparatus according to claim 1, wherein the control unit is configured to cause the compression/expansion unit to expand and recompress the divided compressed data by referring to the compression management table and the compressed information table.

8. The storage apparatus according to claim 1, wherein the control unit is configured to cause the compression/expansion unit to compress the data when unused resources for executing the data compression processing are equal to or greater than a predetermined threshold.

9. The storage apparatus according to claim 1, wherein, as a result of compressing the data, the control unit is configured to suspend the compression processing by the compression/expansion unit when the compression rate of the compressed data is below a predetermined threshold.

10. The storage apparatus according to claim 1, wherein the drive device comprises storage devices of a plurality of types of varying performance, wherein the control unit is configured to manage each storage area which is provided by each of the storage devices of a plurality of types by means of storage tiers of a plurality of different types, and assign storage areas in predetermined units to virtual volumes from any storage tier among the storage tiers of a plurality of types in accordance with the data write request from the host apparatus, and wherein the compression/expansion device is configured to compress the data when the data is migrated from an upper tier to a lower tier of the storage tiers.

11. The storage apparatus according to claim 3, wherein, in storage information of the pre-compression data of the compression management table, the start addresses of the plurality of pre-compression data are each taken as storage information of the post-compression data, the start addresses of the divided compressed data are designated as the same address, values for each of the sizes of the divided compressed data are designated, and values for which the position from the start address of the post-compression data is known are designated.

12. A data management method for a storage apparatus which is connected via a network to a host apparatus which issues data I/O requests, the storage apparatus comprising a storage unit which stores data which is read/written by the host apparatus, a compression/expansion unit which compresses the data using a predetermined algorithm to generate compressed data, and expands the compressed data, and a control unit which controls writing of data to the storage area, the data management method comprising:

a first step in which the control unit divides compressed data compressed by the compression/expansion unit into predetermined units;

a second step in which the control unit manages, as compression block units, the divided compressed data, and padding data; and a third step in which the control unit stores, in a compression management table and in the compression block units, storage information on pre-compression data in association with storage information on the divided compressed data after compression, and wherein, when the data is compressed by means of a coding system which uses sliding dictionary data, the compression/expansion unit generates the sliding dictionary data for each of the divided compressed data and discards the corresponding sliding dictionary data after generating the compression block unit.

* * * * *